(12) United States Patent
Gallinger et al.

(10) Patent No.: US 6,276,058 B1
(45) Date of Patent: *Aug. 21, 2001

(54) SYSTEM AND METHOD FOR MANUFACTURING A RAILCAR

(75) Inventors: Jay S. Gallinger, Plano; Keith A. Young, Princeton, both of TX (US)

(73) Assignee: TRN Business Trust, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,071

(22) Filed: Mar. 10, 1998

Related U.S. Application Data

(60) Provisional application No. 60/050,408, filed on Jun. 20, 1997.

(51) Int. Cl.[7] ............................................. B23P 19/10
(52) U.S. Cl. ........................ 29/897.2; 29/466; 29/469; 29/281.1
(58) Field of Search .................... 29/897.2, 559, 29/897, 428, 432, 466, 469, 525.02, 525.14, 281.4, 281.1, 281.5; 269/43, 37, 287; 104/45, 135; 228/41; 105/396, 397, 413, 414, 421

(56) References Cited

U.S. PATENT DOCUMENTS

| | | |
|---|---|---|
| 1,554,172 | 9/1925 | Nesmith . |
| 2,035,113 | 3/1936 | Blomberg . |
| 2,546,232 * | 3/1951 | Owens .......................... 29/897.2 |
| 2,820,644 | 1/1958 | Smith . |
| 3,098,553 | 7/1963 | Hermanny . |
| 3,176,897 | 4/1965 | Tucker . |
| 3,490,387 | 1/1970 | Halcomb . |
| 3,521,875 | 7/1970 | Kapelsohn . |
| 3,558,124 | 1/1971 | McMichael . |

(List continued on next page.)

*Primary Examiner*—I Cuda Rosenbaum
*Assistant Examiner*—Trinh Nguyen
(74) *Attorney, Agent, or Firm*—Baker Botts L.L.P.

(57) ABSTRACT

A system for manufacturing an aluminum alloy and steel railway car includes an aluminum alloy-body-manufacturing subsystem for producing an aluminum alloy railway car body, a steel-underframe-manufacturing subsystem for producing a steel car underframe, and an underframe-and-body combination subsystem for mating and attaching an aluminum alloy railway car body from the aluminum alloy-body-manufacturing subsystem and a steel underframe from the steel-underframe-manufacturing subsystem. The aluminum alloy-body-manufacturing subsystem of the system may include an openable-and-closeable rotating cage for receiving and aligning car body components and a rotator mechanism coupled to the rotating cage for selectively rotating the rotating cage and components therein. A method for manufacturing a railway car including manufacturing a substantially all-aluminum alloy car body, manufacturing a substantially all-steel car underframe, preparing the underframe for mating with the car body, and mating the car body to the underframe.

4 Claims, 29 Drawing Sheets

U.S. PATENT DOCUMENTS

| | | |
|---|---|---|
| 3,583,331 | 6/1971 | Mowatt-Larssen . |
| 3,639,007 | 2/1972 | Dare et al. . |
| 3,656,607 * | 4/1972 | Gorgei et al. .......................... 104/135 |
| 3,702,914 | 11/1972 | Noura . |
| 3,734,387 | 5/1973 | Sannipoli . |
| 3,830,385 * | 8/1974 | Young ..................................... 104/45 |
| 3,868,101 | 2/1975 | Nozaki et al. . |
| 4,003,319 | 1/1977 | Campbell et al. . |
| 4,020,603 | 5/1977 | Austill . |
| 4,025,034 * | 5/1977 | Randolph et al. ...................... 228/41 |
| 4,027,803 | 6/1977 | Kawasaki et al. . |
| 4,039,115 * | 8/1977 | Randolph et al. ................... 269/287 |
| 4,076,166 | 2/1978 | Austill . |
| 4,202,539 | 5/1980 | Polastri et al. . |
| 4,286,524 | 9/1981 | Jantzen . |
| 4,292,898 | 10/1981 | Gordon et al. . |
| 4,356,615 | 11/1982 | Dearman . |
| 4,425,001 | 1/1984 | Mauri . |
| 4,491,307 | 1/1985 | Ellefson . |
| 4,492,015 | 1/1985 | Dearman . |
| 4,494,291 | 1/1985 | Morrison . |
| 4,504,047 | 3/1985 | Jantzen . |
| 4,579,271 | 4/1986 | Fujita et al. . |
| 4,598,646 | 7/1986 | Dugge et al. . |
| 4,608,931 | 9/1986 | Ruhmann et al. . |
| 4,618,089 | 10/1986 | Hanada et al. . |
| 4,633,787 | 1/1987 | Przybylinski et al. . |
| 4,666,138 | 5/1987 | Dearman . |
| 4,767,046 | 8/1988 | Kumagai et al. . |
| 4,800,820 | 1/1989 | Tomaka . |
| 4,813,843 | 3/1989 | Gilmour et al. . |
| 4,922,833 | 5/1990 | Coulborn et al. . |
| 4,941,411 | 7/1990 | Wong . |
| 4,981,252 | 1/1991 | Yazaki et al. . |
| 5,020,714 | 6/1991 | Miles et al. . |
| 5,203,814 | 4/1993 | Kushizaki et al. . |
| 5,239,753 | 8/1993 | Kalis, Jr. et al. . |
| 5,311,659 * | 5/1994 | Barnhart et al. .................... 29/897.2 |
| 5,499,451 * | 3/1996 | Krivda et al. ....................... 29/897.2 |
| 5,619,784 | 4/1997 | Nishimoto et al. . |
| 5,692,285 | 12/1997 | Weimer et al. . |
| 5,775,870 | 7/1998 | Hogan . |
| 5,830,312 | 11/1998 | Weimer et al. . |

* cited by examiner

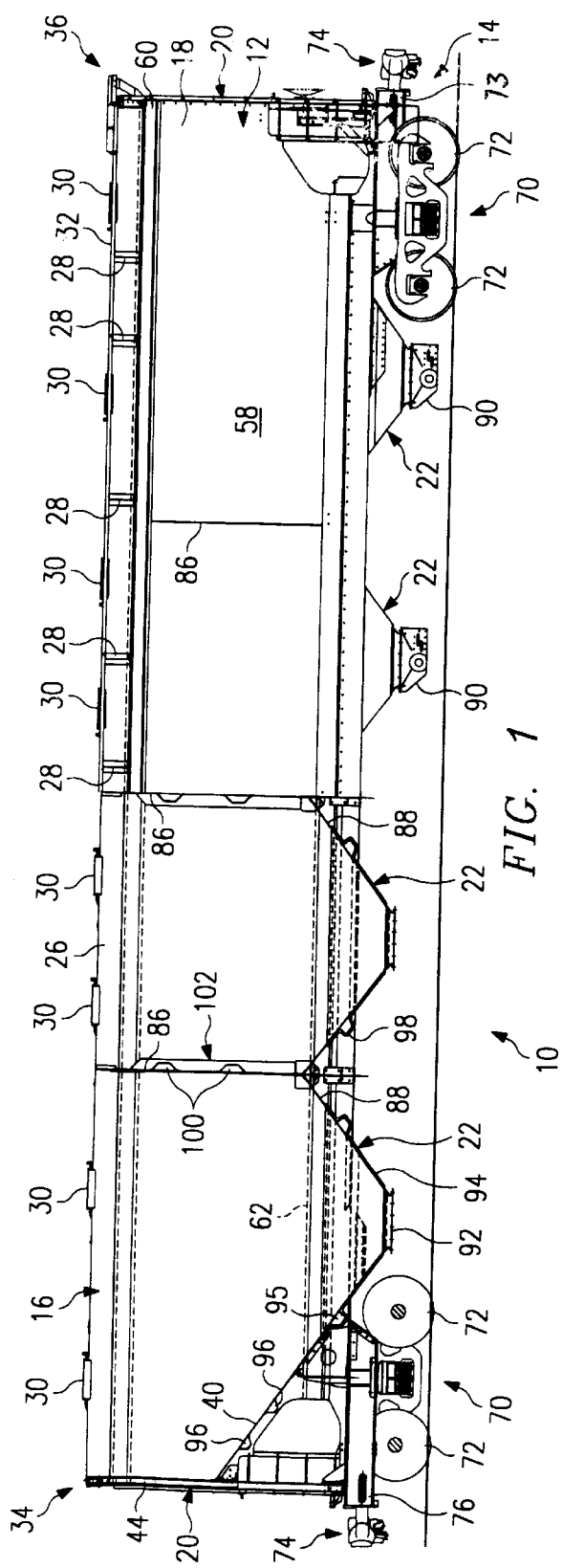
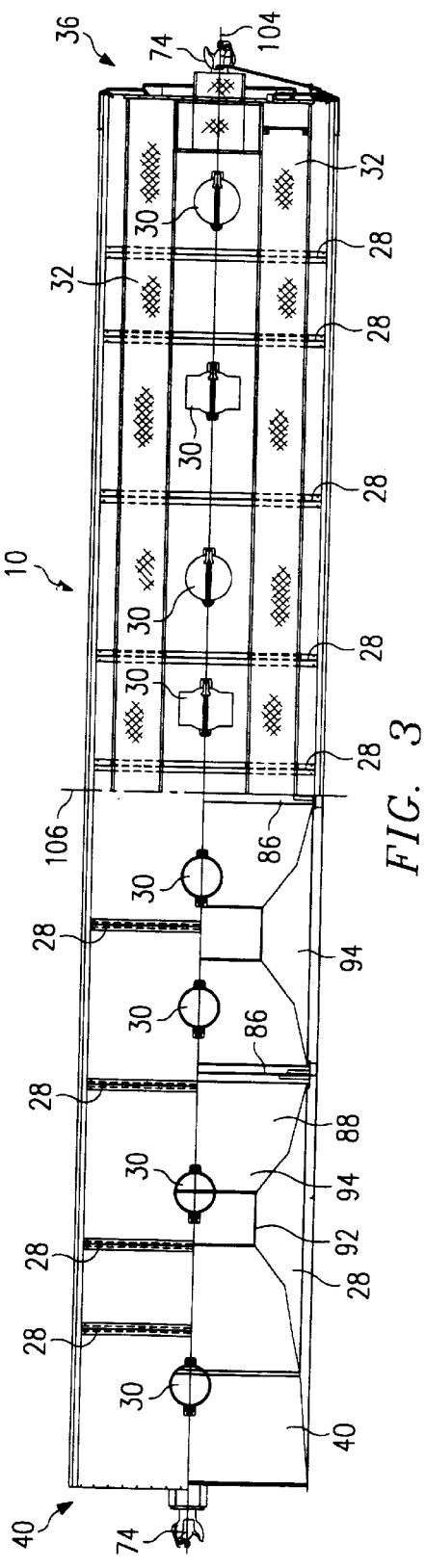

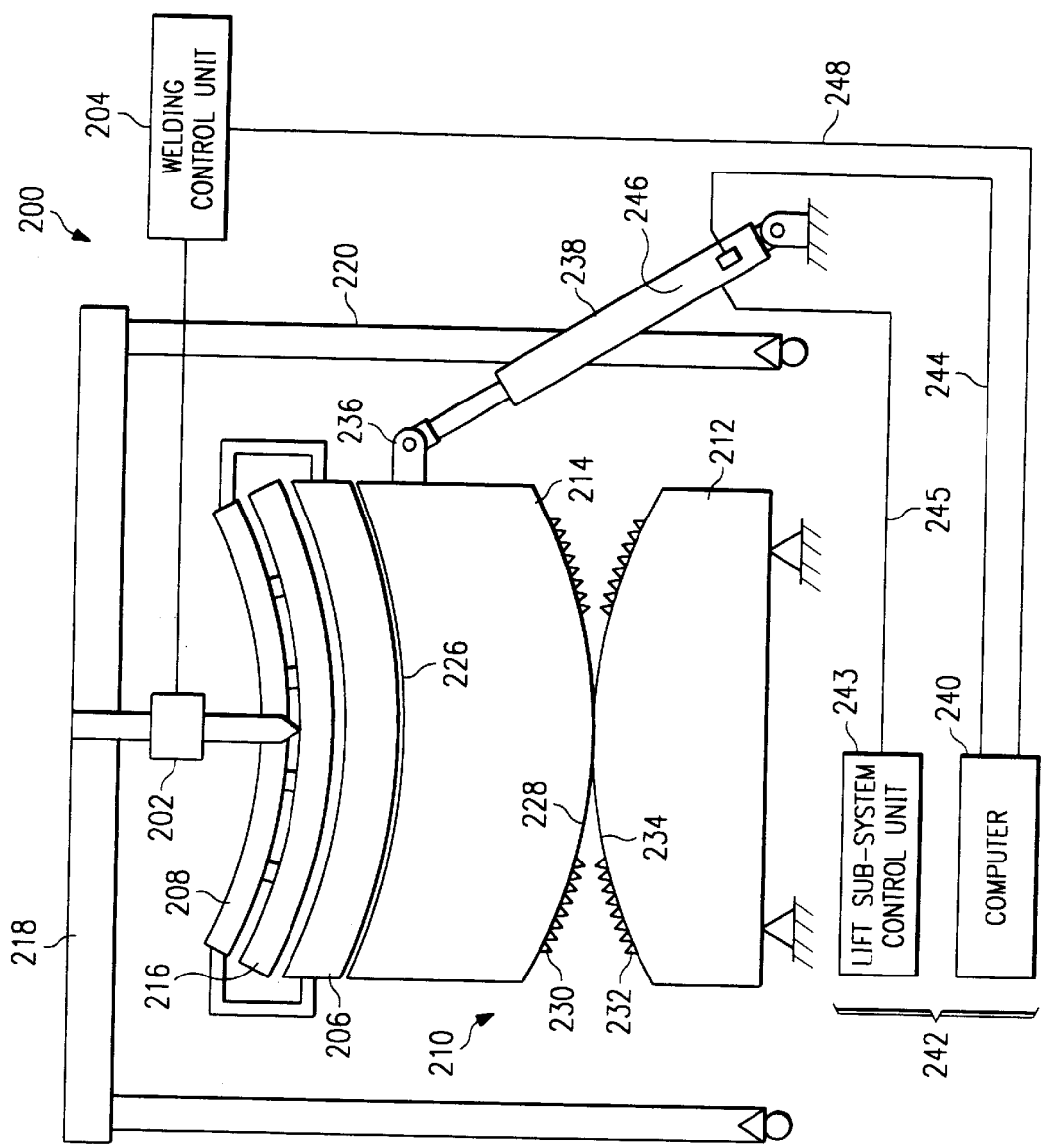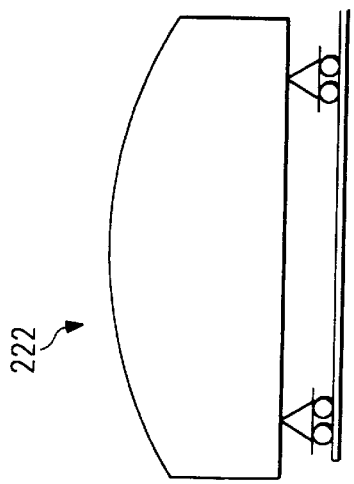
FIG. 5

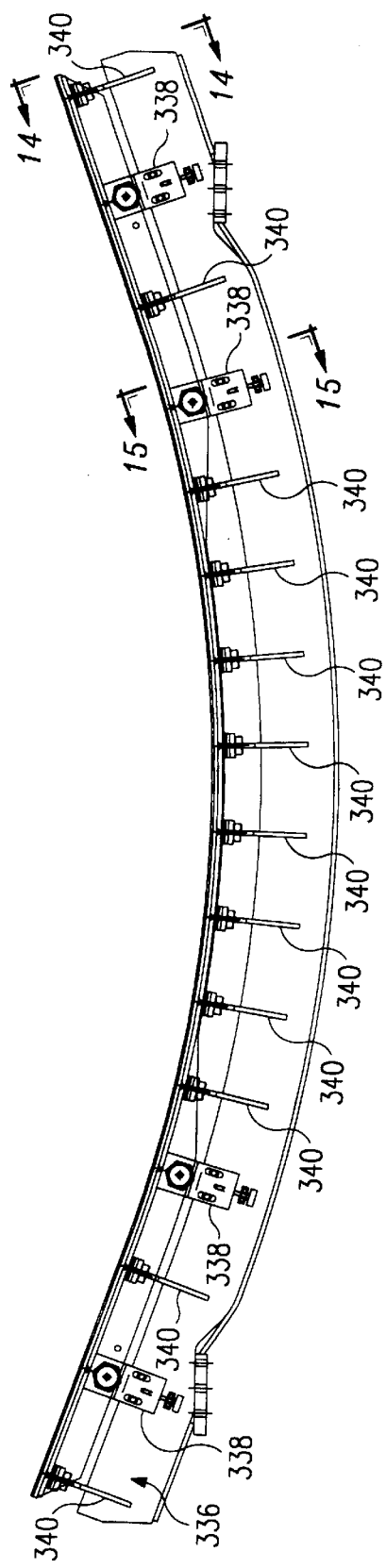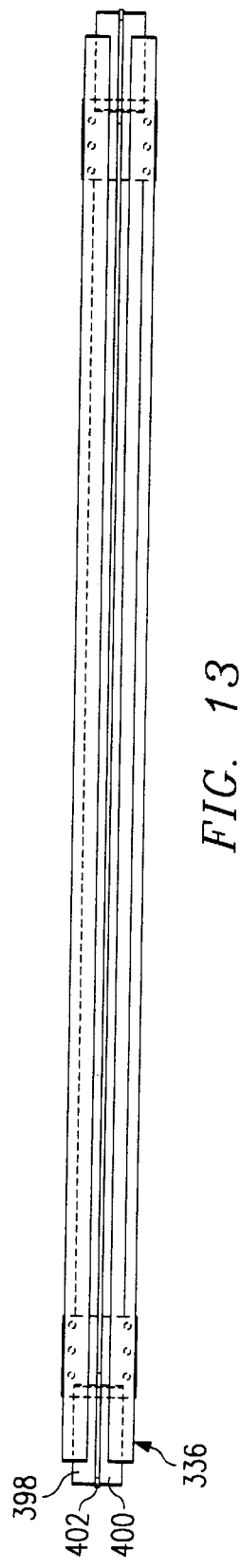
FIG. 12
FIG. 13

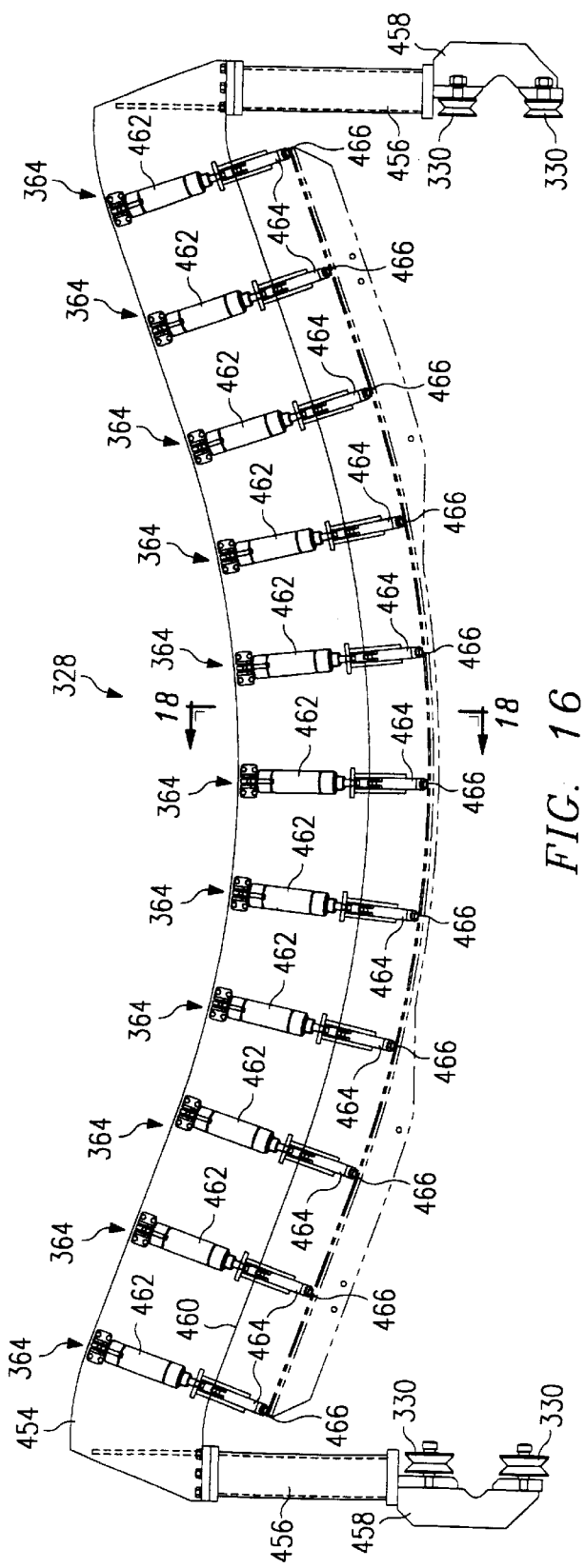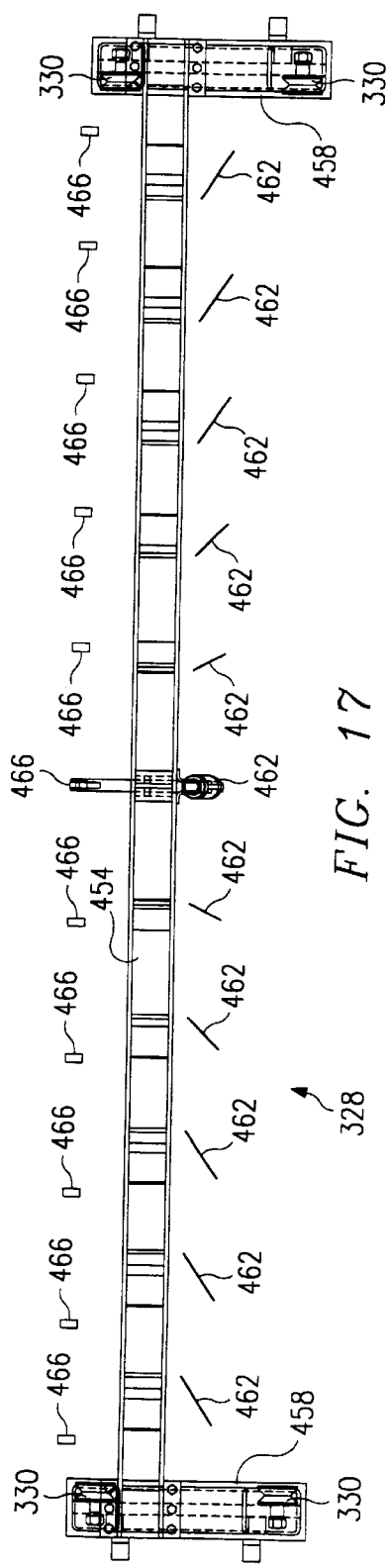
FIG. 16
FIG. 17

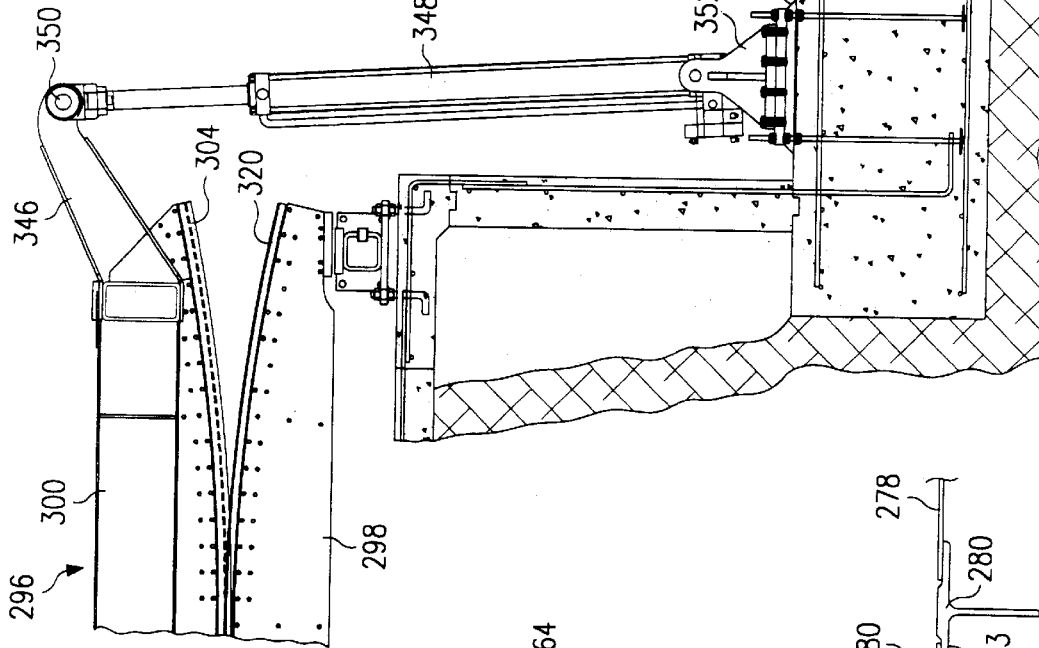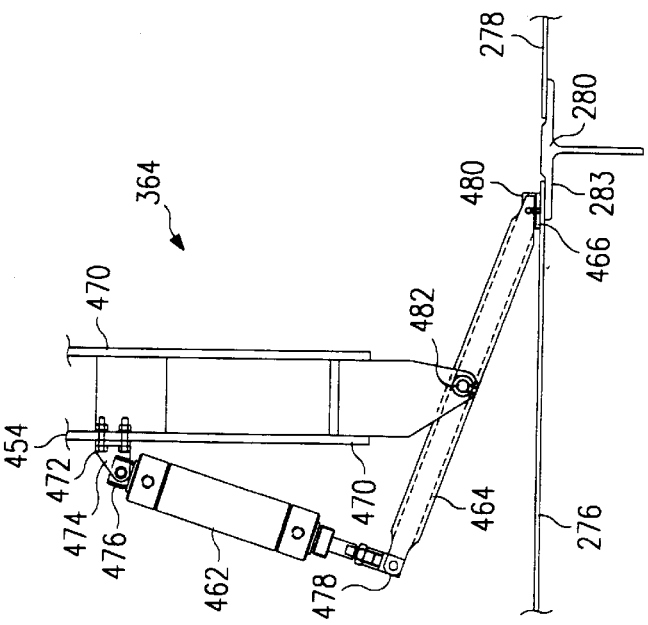

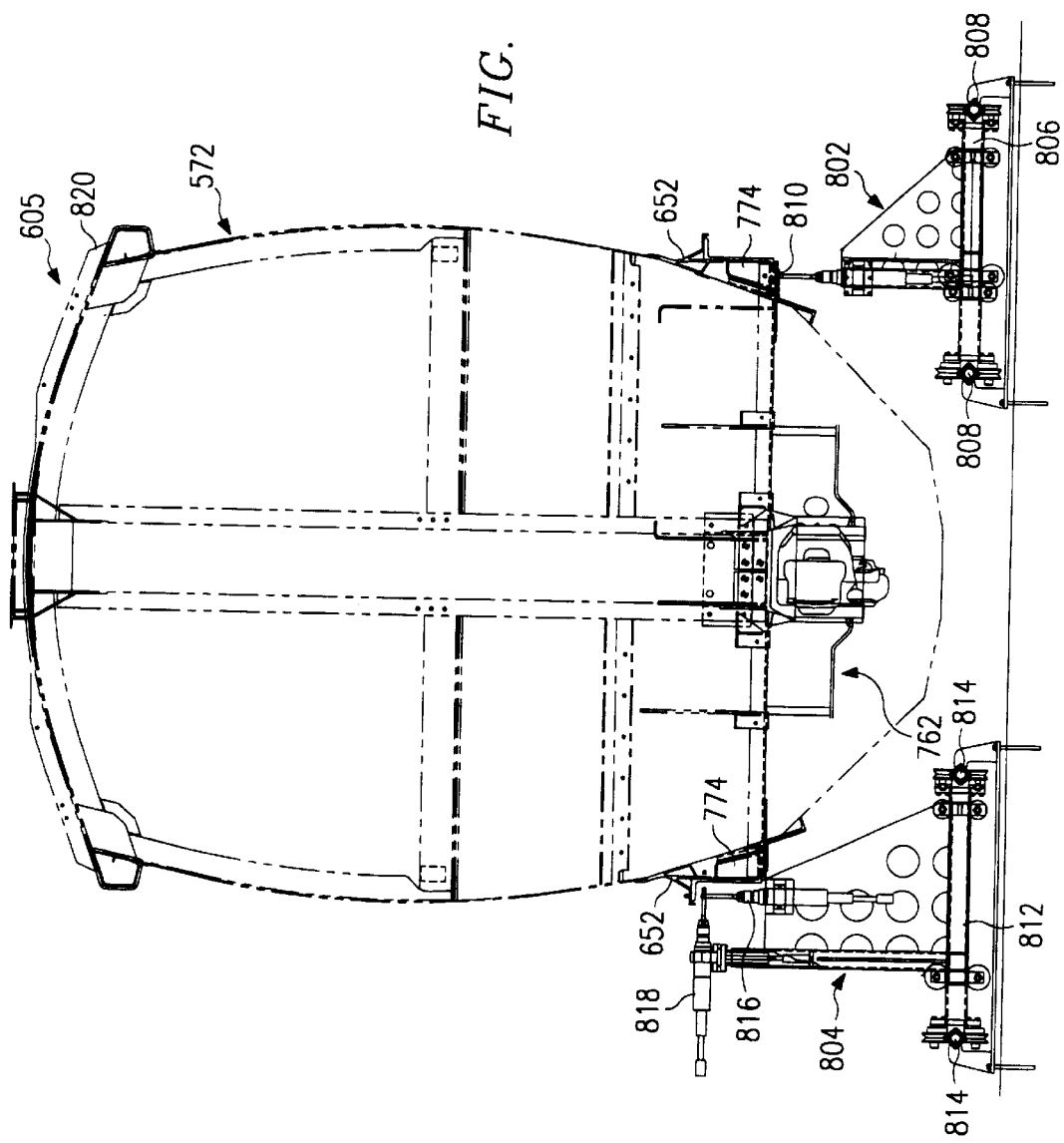

SYSTEM AND METHOD FOR MANUFACTURING A RAILCAR

RELATED APPLICATIONS

This application claims the benefit of U.S. Provisional Patent Application Serial No. 60/050,408 filed Jun. 20, 1997.

This application is related to patent application Ser. No. 09/041,061 filed Mar. 10,1998, entitled System and Method for Manufacturing a Railway Roof, now U.S. Pat. No. 6,220,502; and to copending patent application Ser. No. 09/041,066 filed Mar. 10, 1998, entitled System and Method for Manufacturing a Railcar Body.

TECHNICAL FIELD OF THE INVENTION

The invention relates to railway cars, and more particularly to a system and method for manufacturing a railway car.

BACKGROUND OF THE INVENTION

Railway cars are used to carry goods throughout railway systems. For example, freight cars such as hopper, box, or gondola cars may be used to carry lading throughout the United States. In this regard, there has been a continuing move to increase the amount of lading that may be carried by a given car. Railroads have allowed heavier cars, which allow more carrying capacity, and further increases are being realized by reducing the empty weight or tare weight of the cars.

One manner of reducing the empty weight of a car is to utilize lighter materials such as aluminum alloy. Manufacturing a car substantially of aluminum alloy, however, creates many challenges. Consideration must be given to steel/aluminum alloy interfaces, and if the aluminum alloy is to be welded, special care must be given. For example, in welding aluminum alloy, it is frequently desirable to weld in a plane perpendicular to the gravity force field, i.e., horizontal. Otherwise, a welding puddle may tend to drain in one direction or another.

SUMMARY OF THE INVENTION

According to an aspect of the present invention, a system for manufacturing an aluminum alloy and steel railway car includes an aluminum alloy-body-manufacturing subsystem for producing an aluminum alloy railway car body, a steel-underframe-manufacturing subsystem for producing a steel car underframe, and an underframe-and-body combination subsystem for mating and attaching an aluminum alloy railway car body from the aluminum alloy-body-manufacturing subsystem and a steel underframe from the steel-underframe-manufacturing subsystem. According to another aspect of the present invention, the aluminum alloy-body-manufacturing subsystem of the system may include an openable-and-closeable rotating cage for receiving and aligning car body components and a rotator mechanism coupled to the rotating cage for selectively rotating the rotating cage and components therein.

According to another aspect of the present invention, a method for manufacturing a railway car including manufacturing a substantially all-aluminum alloy car body, manufacturing a substantially all-steel car underframe, preparing the underframe for mating with the car body, and mating the car body to the underframe. According to another aspect of the present invention the step of manufacturing a substantially all-aluminum alloy car body may include placing car body components in an open rotatable cage, closing and locking the rotatable cage, actuating a plurality of compression members to bring body components into alignment, welding portions of the body components with welds accomplished substantially perpendicular to the gravity field, rotating the rotatable cage an incremental amount and welding portions of the body components with welds accomplished substantially perpendicular to the gravity field, and repeating until substantially all the weld-out is completed and the car body is formed as an integral unit.

BRIEF DESCRIPTION OF THE DRAWINGS

A more complete understanding of the invention and its advantages will be apparent from the detailed description taken in conjunction with the accompanying drawings in which:

FIG. 1 is an elevational view of a railway car manufactured according to aspects of the present invention and shown with portions in cross-section;

FIG. 3 is a plan view with two partial cross-sections shown;

FIG. 5 is a schematic diagram of a system for manufacturing a railway car roof according to an aspect of the present invention;

FIG. 12 is an elevational view of a retention portion of a roof retainer frame according to an aspect of the present invention;

FIG. 13 is a plan view of the retention portion of FIG. 12;

FIG. 16 is an elevational view of a clamping gantry according to an aspect of the present invention;

FIG. 17 is a plan view of the clamping gantry of FIG. 16;

FIG. 18 is a detailed portion of the clamping gantry of FIG. 16 taken along line 18—18;

FIG. 19 is an elevational view of a portion of the system for manufacturing a railway car roof of FIG. 6;

FIG. 43 is an elevational end view showing a portion of the underframe and body assembly station, with a car body and underframe shown therein in broken lines, used for match drilling of the aluminum alloy body to the steel underframe.

DETAILED DESCRIPTION OF THE INVENTION

I. Introduction

The preferred embodiments of the present invention and its advantages are best understood by referring to FIGS. 1–43 of the drawings, like numerals being used for like and corresponding parts of the various drawings.

A. An Illustrative Railway Car

Inventions presented herein have applications with numerous types of railway cars. The invention, however, will be presented for illustration purposes as utilized in connection with the manufacture of a plastic pellet, covered hopper car. The car presented for illustration purposes has no mechanical fasteners in the car that would be exposed in the inside of the car and on which the product might hang up. It is to be understood that the systems and methods presented may be used with any number of other cars including cars for carrying grain, chemicals, salt, potash, to name a few.

Figure 2:
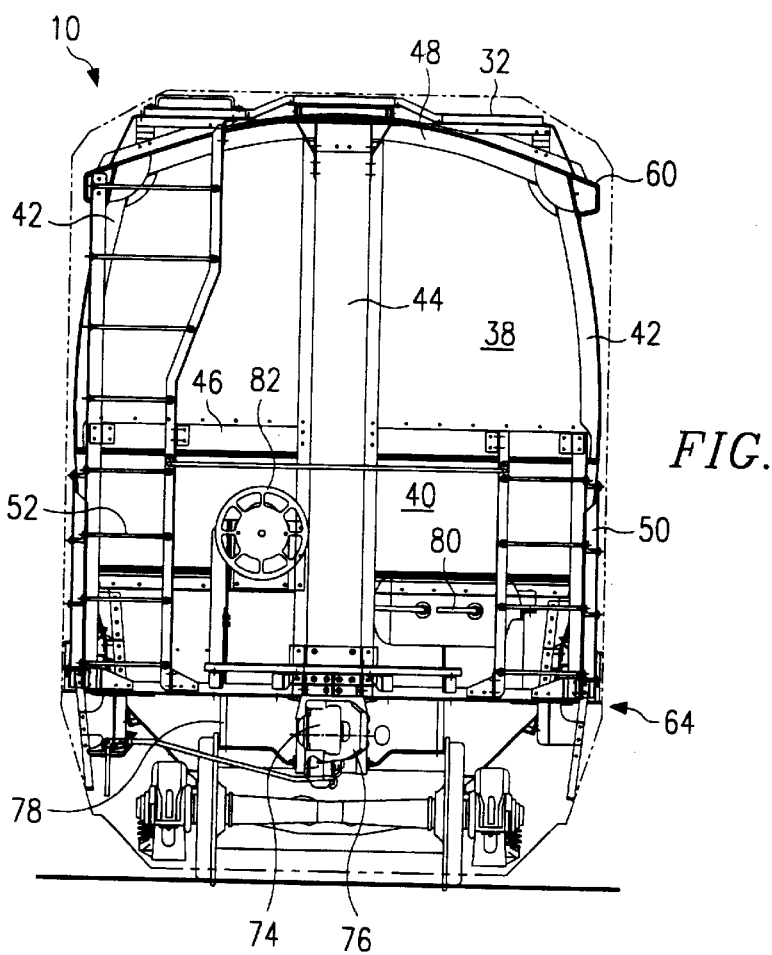
FIG. 2 is an end view of the B-end of the car of FIG. 1.

Referring to FIGS. 1, 2, and 3, an illustrative aluminum alloy-and-steel railway car 10 is presented. In FIG. 1, for the orientation shown, the left portion of the car from the car centerline 106 is shown in crosssection. FIG. 3 also has portions broken away. In FIG. 3, the transverse centerline 106 and the longitudinal centerline 104 form four quadrants for the orientation shown. The portions to the right of center line 106 are a plan view without portions broken away. The upper left quadrant shows roof 16 with running boards 32 and the like removed to show the roof sheets. Finally, the lower left quadrant has roof 16 removed and shows an interior portion of car 10.

Car 10 is an aluminum alloy-and-steel covered hopper car for plastic pellet service. Car 10 has an aluminum alloy or substantially aluminum alloy body 12 and a steel or substantially steel underframe 14. Body 12 includes a roof 16, side sheet assemblies 18, end assemblies 20, and hoppers or hopper chutes 22.

Roof 16 includes a plurality of roof sheets 26 and roof carlines 28. Roof carlines 28 stiffen roof 16, provide structural support, provide a bolting flange for walkway or running board supports (which allow welding to be avoided on the roof panels) and maintain the shape of the roof. A plurality of hatches 30 are formed in roof 16. Hatches 30 provide an entry point for lading into an interior portion of car 10. Roof 16 may further include a longitudinal running board 32, which may run from A-end 34 of the car to B-end 36 of the car. Other standard roof components may be included on roof 16.

End assemblies 20 may include an end sheet 38 and an end slope sheet 40, corner post members 42, bolster post 44, and cross members 46 and 48. When mated with the steel underframe, an additional cornerpost member 50 may be added along with ladder 52. Standard railway car equipment may be added on A end 34 and B end 36 or may be included as part of underframe 14.

Side sheet assembly 18 may include side sheets 58, top chords or P-chords 60 and bottom chords 62. Bottom chord 62 of side sheet assembly 18 mates with the side sill of underframe 14 as shown at reference numeral 64 (FIG. 2). See also 774 of FIG. 43. As will be described further below, side sheet assembly 18 may be mated with roof 16, end assemblies 20, and hoppers 22 to form car body 12. Body 12 may be mated with underframe 14 to form a completed car 10.

Underframe 14 includes a steel side sill (774 of FIG. 43) as discussed previously in connection with reference numeral 64. Underframe 14 includes trucks 70 having wheels 72. Couplers 74 and draft gears 76 are included with underframe 14. Underframe 14 may include standard components including a side bearing plate 78 and a breaking subsystem 80, which includes handbrake 82.

As an aspect of body 12, a plurality of center partition assemblies 86 may be included. Car 10 is shown with three center partitions 86 within a portion of car body 12. Center partition assemblies 86 include slope sheets 88.

Hoppers 22 include discharge or hopper gates 90 which maybe activated to open the gates and allow discharge of the lading from within an interior portion of car 10. Each discharge or hopper gate 90 has a gate frame 92. Coupled to gate frames 92 are slope hopper sheets 94. Sloped hopper sheets 94 may be separate sheets of material or may be formed as part of center partition assemblies 86.

Stiffeners may be used throughout various components and assemblies of car 10. For example, stiffeners 96 may be included on end slope sheet 40 and stiffeners 98 may be included on center partition slope sheets 88. Similarly, stiffeners 100 may be included on vertical portion 102 of center partitions 86.

B. Overview of the Manufacturing Systems and Process

Figure 4:
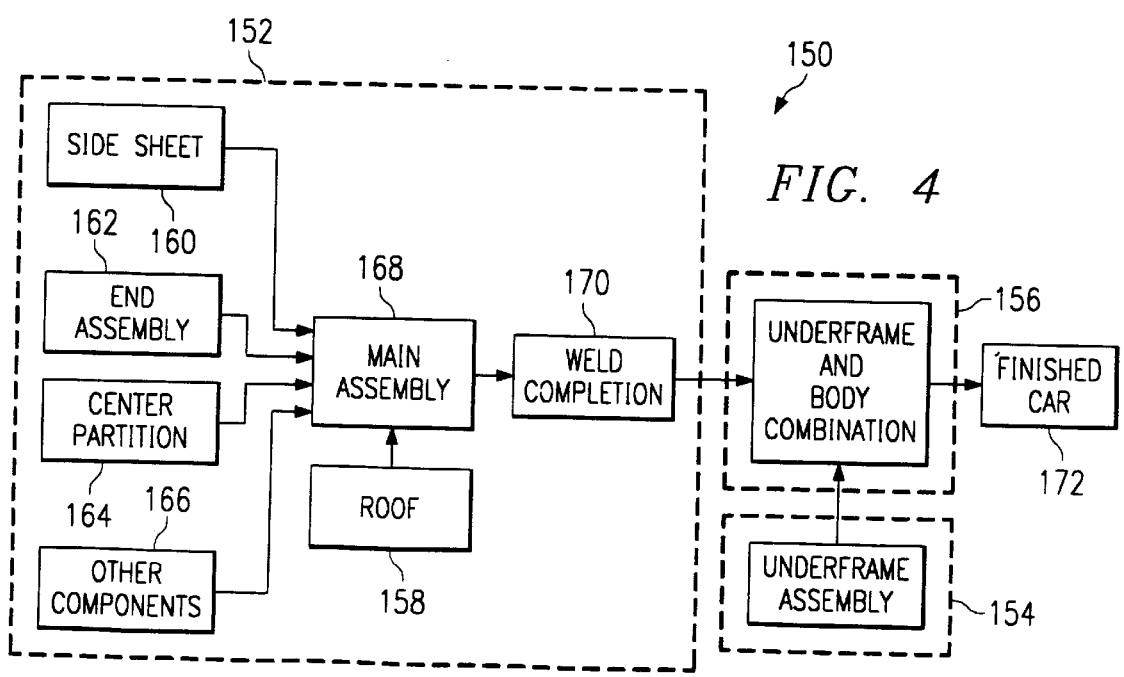
FIG. 4 is a schematic diagram for manufacturing a railway car according to aspects of the present invention.

Referring to FIG. 4, a schematic of a process flow and system according to an aspect of the present invention is shown. Manufacturing system 150 includes an aluminum alloy-body-manufacturing subsystem 152, a steel-underframe-manufacturing subsystem 154, and an underframe-and-body combination subsystem 156. In addition to showing the basic system and subsystems, FIG. 4 presents one embodiment of a process flow that may be used to manufacture a railcar according to aspects of the present invention.

Body manufacturing subsystem 152 may include a roof manufacturing portion as indicated at block 158, side sheet assemblies manufacturing portion as indicated at block 160, an end assembly manufacturing portion as shown at block 162, center partitions manufacturing portion as shown at block 164, and other components manufacturing portion as reflected at box 166. The assemblies and components produced at boxes 158–166 may be combined in a main assembly fixture as reflected at box 168 to form a car body, e.g., body 12 of FIG. 1. When a body is completed in the main assembly fixture shown at block 168, additional weld out may be necessary and may be completed as reflected at box 170. The completed body at block 170 is preferably entirely aluminum alloy.

Underframe manufacturing subsystem 154 includes the necessary processes to manufacture a conventional steel underframe for a railcar. Once completed, the steel underframe may be maneuvered to the underframe-and-body combination subsystem 156. Likewise, the aluminum alloy body produced by subsystem 152 may be brought to combination subsystem 156 where it will be joined with the steel underframe to form a finished car as reflected at box 172.

A number of different methods and systems may be used to produce the car body and the steel underframe and to assemble them according to aspects of the present invention. For illustration purposes, however, these systems and methods will be described for one embodiment in further detail below.

II. Roof Assembly System and Method

Referring now to FIGS. 5–26, a system and method for manufacturing a railcar roof according to aspects of the present invention will be presented. Referring to FIG. 5, a schematic of a system 200 for manufacturing a railcar roof is shown. System 200 is suitable for use in preparing a roof as part of a system for manufacturing a railway car such shown in FIG. 4.

System 200 includes a welding unit 202, which may include a welding control unit 204; a roof retainer or retainer frame 206; a clamping gantry 208; and a rotator subsystem. System 200 allows for a roof sheet 216 to be clamped down to roof retainer 206. As will be described further below, the roof sheets may be clamped by clamping gantry 208 to roof carlines (e.g., 280 of FIG. 14). Welding unit 202 is operable to selectively move back and forth on cross-member 218 of welding gantry 220. The extreme ends of roof sheet 216 are substantially straight portions for which welding unit 202 alone will suffice to provide the preferred welding orientation (welding plane substantially perpendicular to the gravity field, i.e, horizontal), but for the arced or curved portions of roof sheet 216, in addition to moving welding unit 202, the rotating subsystem rotates roof sheet 216 relative to the welding unit in a coordinated fashion to maintain the preferred welding orientation (an example sequence is shown in FIGS. 20–24). This welding process is carried out for each roof sheet, and this forms a structure to which hatch openings may then be cut and hatches installed. The hatches may be installed directly while on rotating unit 210, or alternatively roof retainer 206 may be moved to a hatch installation station 222 where the tasks are performed.

The rotator subsystem may include a rotating unit 210 having a first portion 212 (also referred to as the lower rocker roof base) and a second portion 214 (also referred to as the upper roof rocker base). The roof of retainer 206 may be secured to a surface 226 of second portion 214 of rotator unit 210. A second surface 228 of second portion 214 may be curved or arced having teeth 230 designed to mate with teeth 232 on a first surface 234 of first portion 212 of rotating unit 210. A lift subsystem may be used to cause surfaces 228 and 234 to rotate with respect to their other, causing roof retainer 206 to also rotate. The lift subsystem may include, for example, a linear displacement member such as a hydraulic cylinder 238 attached to a bell crank 236, which is coupled to second portion 214. The hydraulic cylinder 238 may be selectively extended and retracted to cause the relative rotation of rotating unit 210. The rotation caused by hydraulic cylinder 238 may be carefully controlled by a computer 240 having a microprocessor, memory, and programming adequate to carry out the controlled rotation and tasks referenced herein. Computer 240 may be coupled by an interface 242 such as a cable or other means to a lift sub-system control unit 243 causing the appropriate hydraulic influence on cylinder 238 in response to control commands from computer 240. Computer 240 may also be coupled to an interface 244 such as a cable or other means to a sensor 246 that accurately measures the displacement of cylinder 238. For example, sensor 246 may emit a signal that travels in the inside of cylinder 238 to an extreme end of the cylinder, at which point, the signal is reflected and returned back to sensor 246. Such a sensor is commercially available from TEMPOSONIC. In a manner similar to radar, sensor 246, can thus, accurately determine the distance to the end of cylinder 238 and used to control movement. This information is transmitted to computer 240 and lift subsystem control unit 243 and used to control movement.

Lift control subsystem 243 may also be connected by a cable 245 or other means to cylinder 238.

Because it is desirable that the speed of welding of welding unit 202 relative to roof sheet 216 be controlled, computer 240 may be coupled by cable 248 or other means to welding control unit 204. The speed of the welding unit 202 is manually set by the operator and controlled by the welding control unit 204. In the preferred embodiment of the present invention welding unit 202 has two operating speeds designated as "slow" and "fast". The speed of the welding unit 202 is read by computer 240 through cable 248. Computer 240 then adjusts the speed of cylinder 238 via the lift control system 243. Rotating unit 210 may be a solid unit that runs substantially the longitudinal length of the roof or may include a number of rings or separate portions spaced along the roof adequate to support roof retainer 206.

Curved surfaces 234 and 228 are shown on rotating unit 210, but it is to be understood that in alternative embodiments or other systems, a flat surface may be used. For example, a standard rack and pinion might also be used to provide the desired movement. Similarly, cylinder 238 is shown, but other members might be used for causing movement of rotator unit 210 such as a ball screw, cam, or cables.

Figure 6:
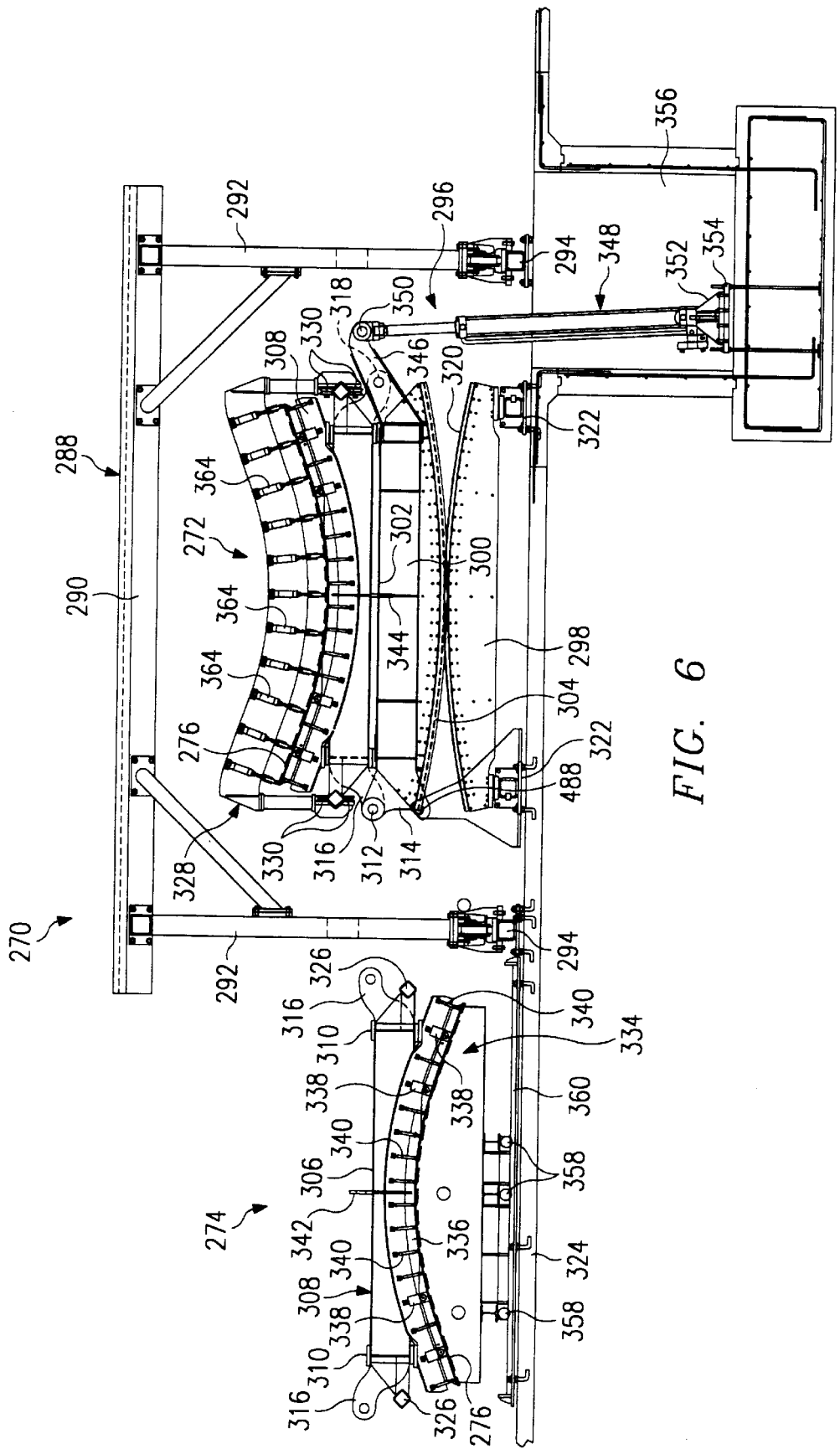
FIG. 6 is an elevational view of a system for manufacturing a railway car roof according to an aspect of the present invention.

Referring to FIGS. 6–26, a more specific illustrative embodiment of a roof manufacturing system and method are presented. Referring to FIG. 6, a system 270 for manufacturing a roof for a railcar is presented in elevation. For the embodiment shown, system 270 includes a roof sheet welding station 272 and a hatch installation station 274. At station 272, a plurality of roof sheets are welded to a plurality of roof carlines. For example, refer to FIG. 14, two roof sheets 276 and 278 are shown clamped to a portion of a roof carline 280. Roof sheets 276 and 278 are overlapped on lateral portions 283 and 285 of carline 280. During the welding process, welds will be accomplished in the vicinity indicated by reference numbers 282 and 284. As will be described further below, a portion 286 of carline 280 will help hold a longitudinal running board such as running board 32 of FIGS. 1–3.

Referring again to FIG. 6, a welding unit (such as 202 of FIG. 5) is suspended from welding gantry 288. The welding unit is movable along cross-member 290 in a controlled fashion as described in connection with welding unit 202 and welding gantry 220 of FIG. 5. Cross-member 290 of welding gantry 288 is supported by vertical supports 292, which are in turn supported by and are slidable on tracks 294. Thus, for the orientation shown in FIG. 6, welding gantry 288 would slide on tracks 294 into and out of the surface of the page.

Figure 8:
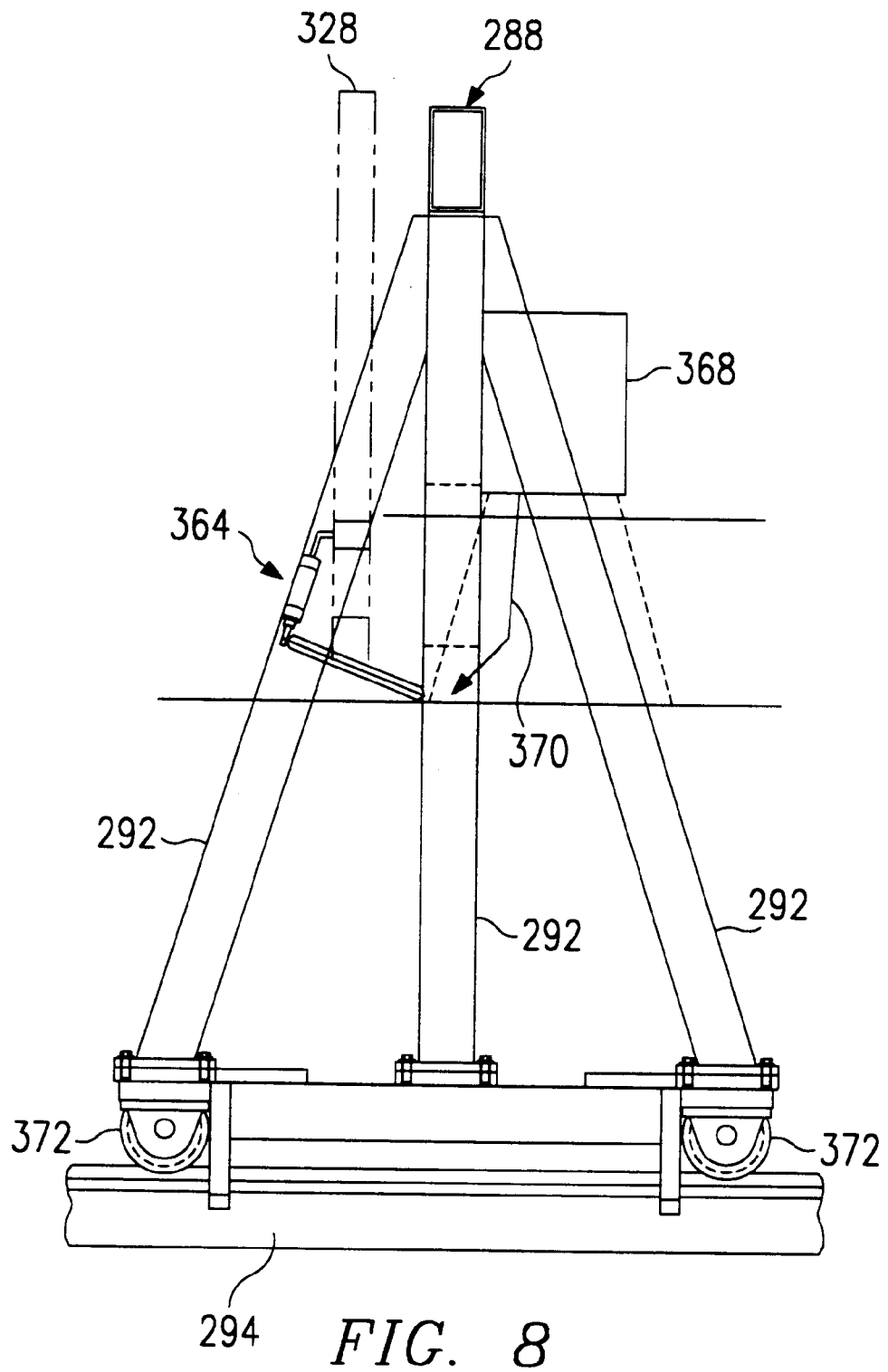
FIG. 8 is an elevational side view of a welding gantry for use with the system of FIG. 6 according to an aspect of the present invention.
Figure 9:
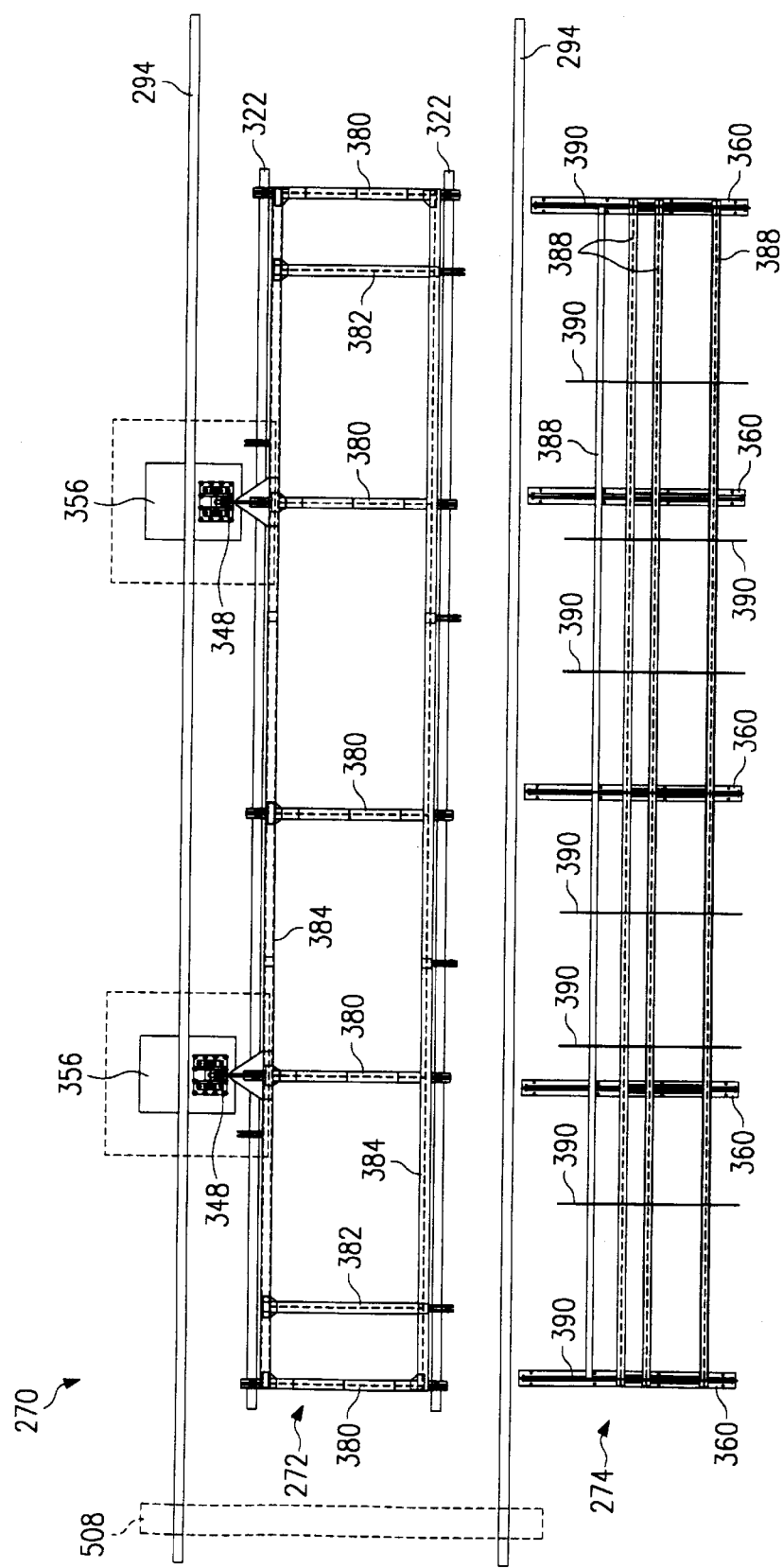
FIG. 9 is a plan view of a system for manufacturing a railway car roof according to an aspect of the present invention.

System 270 includes a rotator unit 296 having a lower roof rocker base 298 and an upper roof rocker base 300, which collectively may be referred to as roof rockers (e.g., 380 of FIG. 9). Upper roof rocker base 300 has a first surface 302 and a second surface 304. For the embodiment shown in FIGS. 6–19, the radius of surface 304 is approximately twenty-four feet, six inches and the radius of the roof-sheet-receiving surface of roof retention portion 336 is approximately nine feet, three inches; these dimensions are schematically demonstrated in FIG. 20 by reference numerals 500 and 502, respectively. First surface 302 is sized and configured to receive and support surface 306 of roof retainer frame 308. Surface 306 has a locating pin 342 designed to mate with a cavity 344 on surface 302 of upper roof rocker base 300 when the roof retainer frame 308 is being placed thereon.

In FIG. 6, two roof retainer frames 308 are shown; one at roof sheet welding station 272 and one at hatch installation station 274. Longitudinal beams 310 on surface 306 of roof retainer frame 308 rest on a portion of surface 302 when positioned on rotator unit 296. Roof retainer frame 308 may be held to upper roof rocker base 300 by pivot pin 312, which extends through an aperture on a portion 314 of upper roof rocker base 300 and through a bell crank portion 316 of frame 308. Additionally, frame 308 may be coupled on the other side with a pin positioned at aperture 318 in a like manner.

Figure 7:
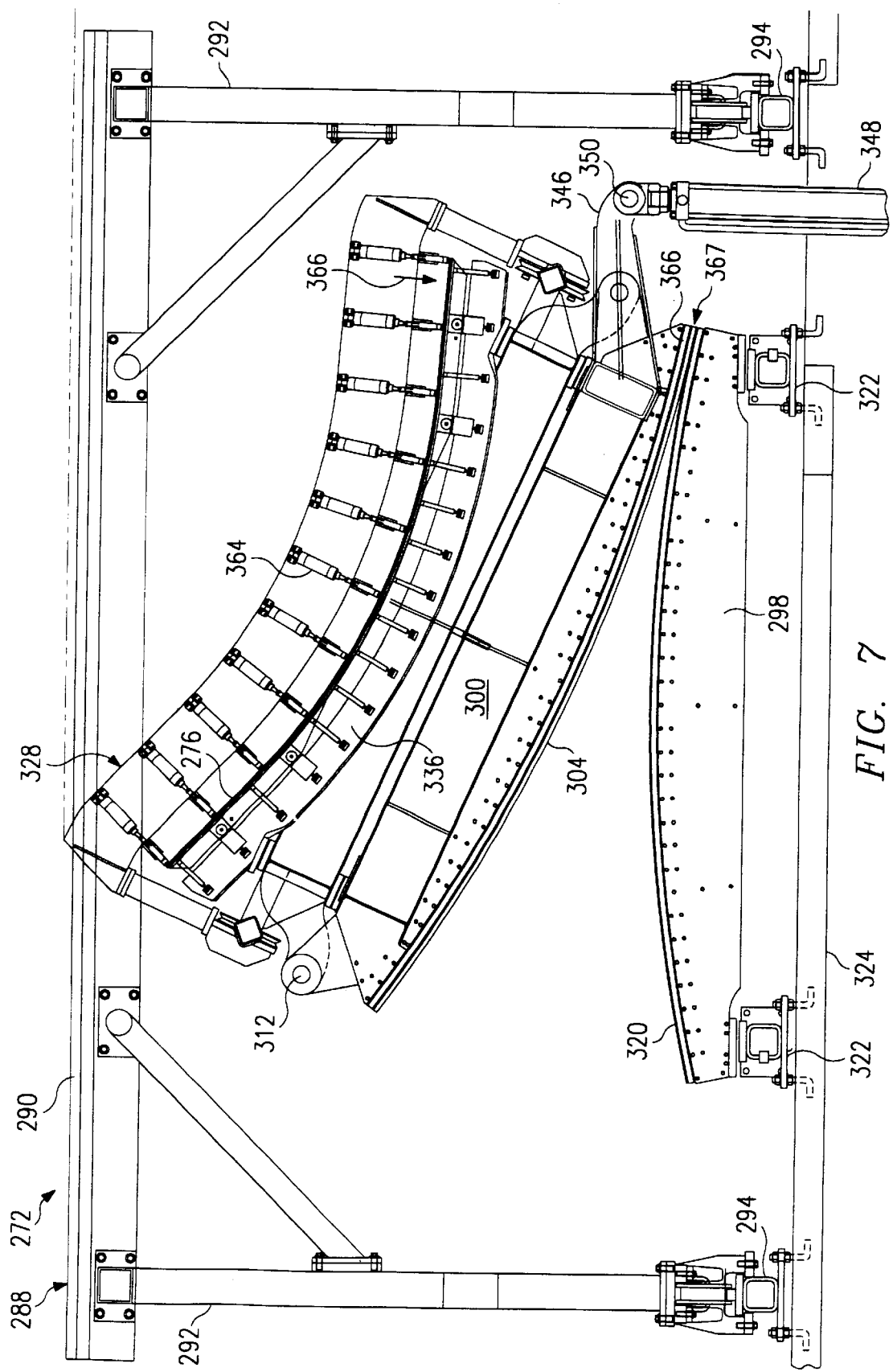
FIG. 7 is an elevational view of a welding station of the system of FIG. 6 in a first extreme position.

Arced surface 304 of upper roof rocker base 300 interfaces with a first surface 320 of lower roof rocker base 298. As shown in FIG. 7, lower roof rocker base 298 is secured by anchors 322 to shop floor 324. Additional features of rotator unit 296 will be described further below.

Retainer frame 308 includes longitudinal tubes 326. In welding station 272, a clamping gantry 328 has V-rollers 330 that roll against tubes 326 to allow positioning of clamping gantry 328. Clamping gantry 328 has a plurality of clamping mechanisms 364, which are discussed in more detail below in connection with FIG. 18. Bell cranks 316 on roof retainer frame 308 assist in holding roof retainer frame against upper roof rocker base 300 and also assist with pivoting of roof retainer frame 308 about pivot pin 312 to allow the roof retainer frame to be flipped and placed on roof retainer support stand 334. This will be described further below in connection with FIG. 26.

A roof retention portion 336 of roof retainer frame 308 assists in holding a roof sheet, such as sheet 276 to roof retainer frame 308 and a plurality of roof carlines. Roof retainer frame 308 is shown with four carline alignment-and-holding mechanisms 338 as will be described further below. These mechanisms 338 place a pin through apertures in a portion of the roof carlines (e.g., portion 286 of roof carline 280 of FIG. 14 and as shown more specifically in FIG. 15). Roof retaining portion 336 also has a plurality of adjustable- roof-supporting mechanisms 340 as will be described in more detail in connection with FIG. 14.

Returning to rotator unit 296, upper roof rocker base 300 has a bell crank 346 to which forces may be applied in certain situations to cause surface 304 of upper roof rocker base 300 to rotate against surface 320 of lower roof rocker base 298. Forces may be applied to bell crank 346 by hydraulic cylinder 348. Hydraulic cylinder 348 is attached at a first end 350 to bell crank 346 and at a second end 352 to an anchor 354 in a pit 356 (see FIG. 19) formed in shop floor 324. The rotation may be for a range of movement. FIG. 6 shows roof rocker base 300 in a neutral position with respect to lower roof rocker base 298. Operation of system 270 will be explained further below.

Roof retainer support stand 334 (see the left-hand portion of FIG. 6) is in this embodiment a stand for holding roof retainer frame 308 once welding has been completed at roof sheet welding station 272. Roof retainer support stand 334 is supported on rollers 358 that are movable or slidable on a track 360. When welding gantry 288 is rolled on its track 294 to a parked position out of the way, roof retainer support stand 334 may be positioned on track 360 proximate to roof sheet welding station 272 such that roof retainer frame 308 may be pivoted about pivot point 312 and over onto roof retainer support stand 334. See FIG. 26.

Referring to FIG. 7, roof sheet welding station 272 of system 270 is shown with rotating unit 296 in a first extreme position. In the position shown, cylinder 348 has been retracted to cause upper roof rocker base 300 to rotate or roll with respect to surface 320 of lower rocker base 298 such that only a second edge 366 is in contact. In this position, the welding unit may apply a weld perpendicular to roof sheet 276 as suggested by arrow 367. In the area of arrow 366, roof sheet 276 is substantially flat for a distance. That distance may be welded by moving the welding unit along cross-member 290, and upon reaching an arced or curved portion of roof sheet 276, cylinder 348 may begin to rotate upper roof rocker base 300 with respect to lower roof rocker base 298. This sequence will be shown further below in connection with FIGS. 20–24.

Referring to FIG. 8, a side view of welding gantry 288 and clamping gantry 328 is shown. A welding unit 368 is shown in this view extending from a portion of gantry 288. Weld unit 368 will apply a weld with a member as suggested by arrow 370. From this view, vertical supports 292 can be seen to be supported by rollers 372 on track 294. This allows welding gantry 288 to be positioned at different locations along a roof being constructed. Clamping gantry 328 is preferably attached (e.g., rollers on tubes 326) to roof retainer frame 308 and allowed to rotate with it.

Referring now to FIG. 9, a plan view of system 270 of FIG. 6 is shown with roof retainer frames 308, clamping gantry 328, and welding gantry 288 removed. Roof sheet welding station 272 and hatch installation station 274 are shown in their preferred relationship. For this embodiment, it can be seen that the rotating unit has five spaced roof rockers 380, which include a lower roof rocker base 298 and an upper roof rocker base 300 with each. Cross-members or cross beams 382 are secured to longitudinal frame members 384 to form a frame to which lower roof rocker base 298 of each roof rocker 380 may be attached.

Hatch installation station 274 includes a plurality of support members, beams or bars, 388 connected with a plurality of support members 390, which are convex shaped and sized and configured to receive the arced or curved track-side portion of the roof sheets and gantry that are connected to roof retaining frame 308. Thus, hatch installation station 274 will support roof retaining frame 308 at selected, discreet points to allow for the cutting of hatch openings and placement of hatches into a roof. This process may take place at station 274 while another roof gantry is loaded at station 272 to begin welding roof sheets to roof carlines.

Figure 10:
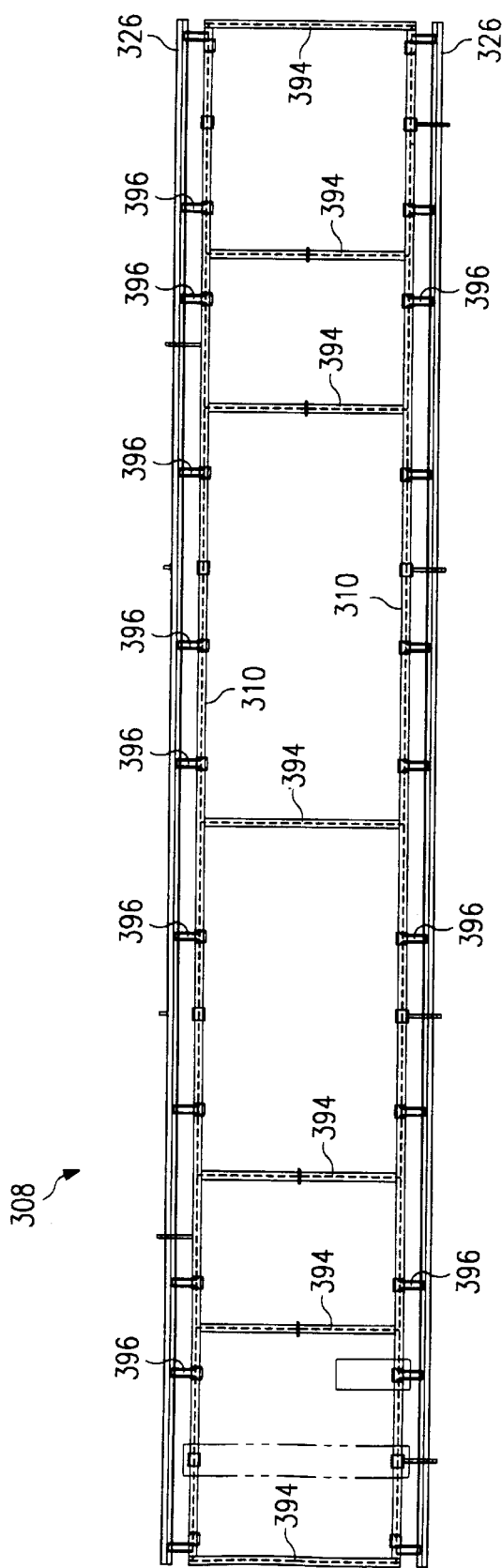
FIG. 10 is a plan view of a roof retainer frame according to an aspect of the present invention.
Figure 11:
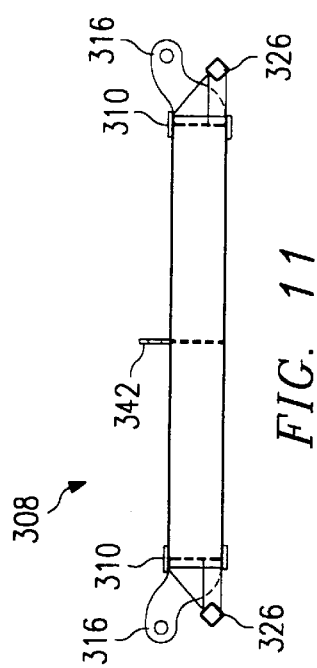
FIG. 11 is an elevational end view of a roof retainer frame according to an aspect of the present invention.

Referring now to FIGS. 10 and 11, a plan view and end view of roof retainer frame 308 are shown without roof retaining portion 336. Longitudinal beam members 310, together with a plurality of cross-members 394, form a basic frame structure to which a plurality of roof retainer portions 336 may be added. Roof retainer portions 336 are curved or concave shaped for receiving a portion of the roof sheets in the shape of the desired roof. For example, there may be ten or more such retainer portions 336. See FIG. 6. Longitudinal tubes 326 are attached to longitudinal members 310 by a plurality of supports 396.

Figure 14:
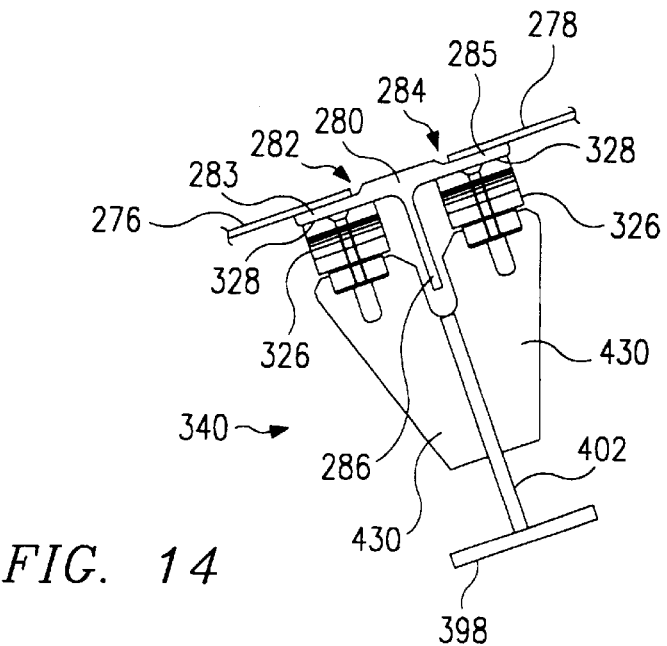
FIG. 14 is an end view of the roof retention portion taken along line 14—14 of FIG. 12.

Referring now to FIGS. 12 and 13 roof retention portion 336 of roof retainer frame 308 is presented. As shown in FIG. 13, curved structural member 398 has a flanged portion 400 and a vertical portion 402. Referring to FIG. 14, a cross-sectional view taken along line 14—14 of FIG. 12 is shown. FIG. 14 shows adjustable-roof-support mechanism 340. Mechanism 340 includes shims 326 adjustable to vary the point at which a surface 328 encounters gantry 280 placed thereon. Shims 326 are carried by lateral offset members 430 on vertical portion 402 of member 398. The ability to adjust shims 326 provides increased flexibility with system 270 to account for the possibility of shrinkage of material during welding. This maybe particularly useful with aluminum alloy, which tends to shrink more during welding than other materials.

Figure 15:
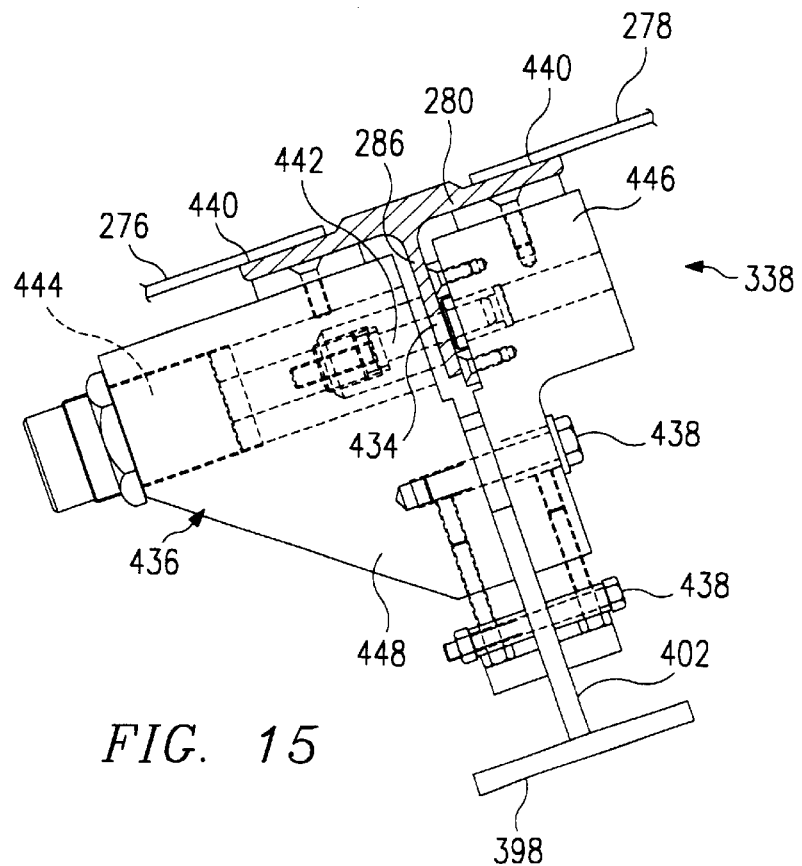
FIG. 15 is a cross sectional view of the roof retention portion of FIG. 12 taken along line 15—15.
Figure 20:
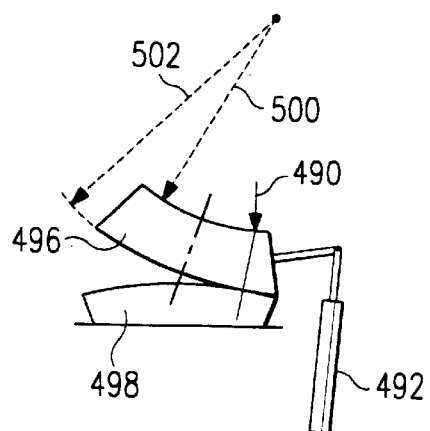
FIGS. 20–24 are schematic diagrams showing representative rotation of portions of the system for manufacturing a railway car roof according to an aspect of the present invention.
Figure 21:
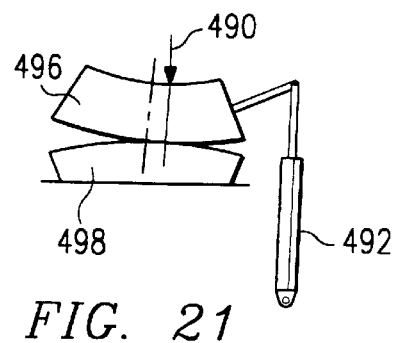
Figure 22:
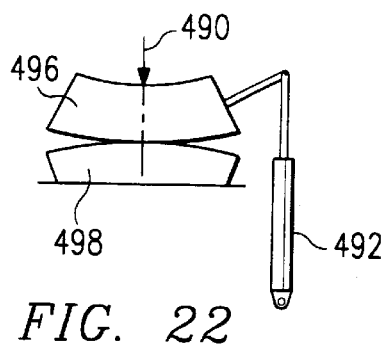
Figure 23:
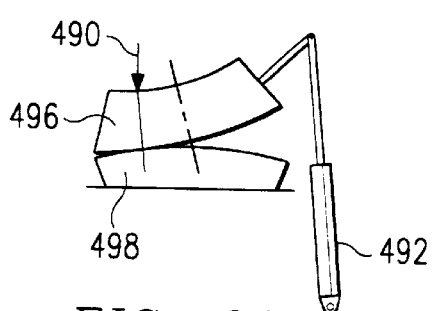

Referring to FIG. 15, a cross-section taken along the lines 15—15 of FIG. 12, is shown. FIG. 15 shows a roof carline alignment-and-holding mechanism 338. The roof carline, which is a lateral member described earlier, is fabricated with four holding and alignment apertures on an offset portion 286 such as aperture 434. An actuator unit 436 is attached at the appropriate location on vertical portion 402 of structural member 398. Actuator unit 436 may, for example, be bolted to vertical portion 402 as shown by fasteners 438. Actuator unit 436 may include surfaces 440 for receiving roof sheets 276 and 278. Actuator unit 436 includes an air or hydraulic actuated pin 442. In the extended position, pin 442 extends through aperture 434 to align and hold roof carline 280. Actuator unit 436 has an actuation side 444 and a receiving side 446. An air source or hydraulic source may be used to energize actuation side 444 to cause pin 442 to enter aperture 434. When the actuating force or pressure of actuation side 444 is removed, pin 442 may also be retracted. Gusset plate 448 can provide additional support for unit 436.

Referring now to FIGS. 16 and 17, an elevation view and a plan view of clamping gantry 328 are presented. Clamping gantry 328 has a main cross member 454 extending between vertical support members 456. Vertical support members 456 are supported by roller units 458, having V rollers 330. Cross member 454 is arced or curved such that its lower surface 460 preferably approximates the curvature of the roof to be formed. A plurality of clamping mechanisms 364 are positioned along cross-member 454. As will be explained further in connection with FIG. 18, each clamping mechanism 364 has an actuating cylinder 462 and a pivoted clamping arm 464. When actuated, actuation cylinder 462 causes pivot clamping arm 464 to press a clamping surface 466 against a roof sheet, pressing it against a roof carline such that welding with the desired fit up may be obtained.

Referring to FIG. 17, the orientation of actuating cylinders 462 and the proximate location of clamping surfaces 466 are shown. The center clamping mechanism 364 is shown with more detail.

Referring now to FIG. 18, a representative clamping mechanism 364 for use on clamping gantry 328 is shown. As shown in this cross-section, cross member 454 may include two displaced plates 470. Actuating cylinder 462, which may be an air cylinder or a hydraulic cylinder, is attached with fasteners 472 and plate 474 at a first or fixed end 476 and is attached at the moveable or second end 478 to a first end of pivoting clamping arm 464. Clamping surface 466 is formed on a second end 480 of pivot arm 464. Pivot arm 464 is pivotally connected on an intermediate portion to cross member 454, as shown by pivot point 482. It will be appreciated that when actuator cylinder 462 extends or retracts, it will cause pivot arm 464 to pivot about pivot point 482 to allow pressure to either be applied or removed from clamping surface 466. When actuator 462 is fully extended, clamping surface 466 is completely removed and out of the way from the clamping area.

Referring now to FIG. 19, a portion of roof sheet welding station 272 of system 270 is shown. Actuator cylinder 348 is shown in pit 356 which may be further anchored and supported by concrete support 486. It will be appreciated that as cylinder 348 is extended and retracted with rotating unit 296 unlocked, it will cause roof rockers 298 and 300 to rotate with respect to each other. For safety, if lock pin 488 (FIG. 6) is in place, the members will not rotate. Thus, before rotation is desired, lock pin 48 should be removed.

Figure 24:
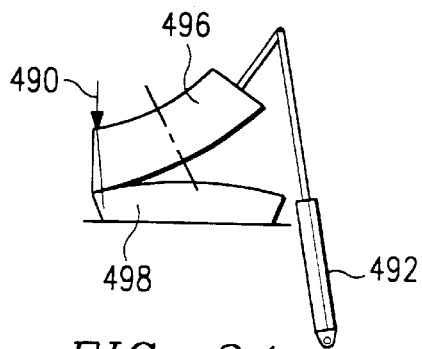

Schematic diagrams showing a rotation sequence are presented in FIGS. 20–24. The first extreme position (see FIGS. 20 and 7) has already been initiated, and then the flat portion of the roof is welded. Once the welding unit has welded roof sheet to the roof carline in the straight area of the roof, actuating cylinder 492 causes upper roof rocker 496 to start rotating with respect to lower roof rocker base 498. Thus, as shown by FIGS. 20 through 24, actuator 492 causes rotation as welding unit 490 moves across. Thus, 421 is a little farther than that shown in FIG. 20 and likewise in FIGS. 22, 23, and 24. In FIG. 24, a second extreme position has been reached. As discussed in connection with FIG. 25, the movement may be coordinated by movement of the actuator versus the desired amount of movement of the roof sheet.

Figure 25:
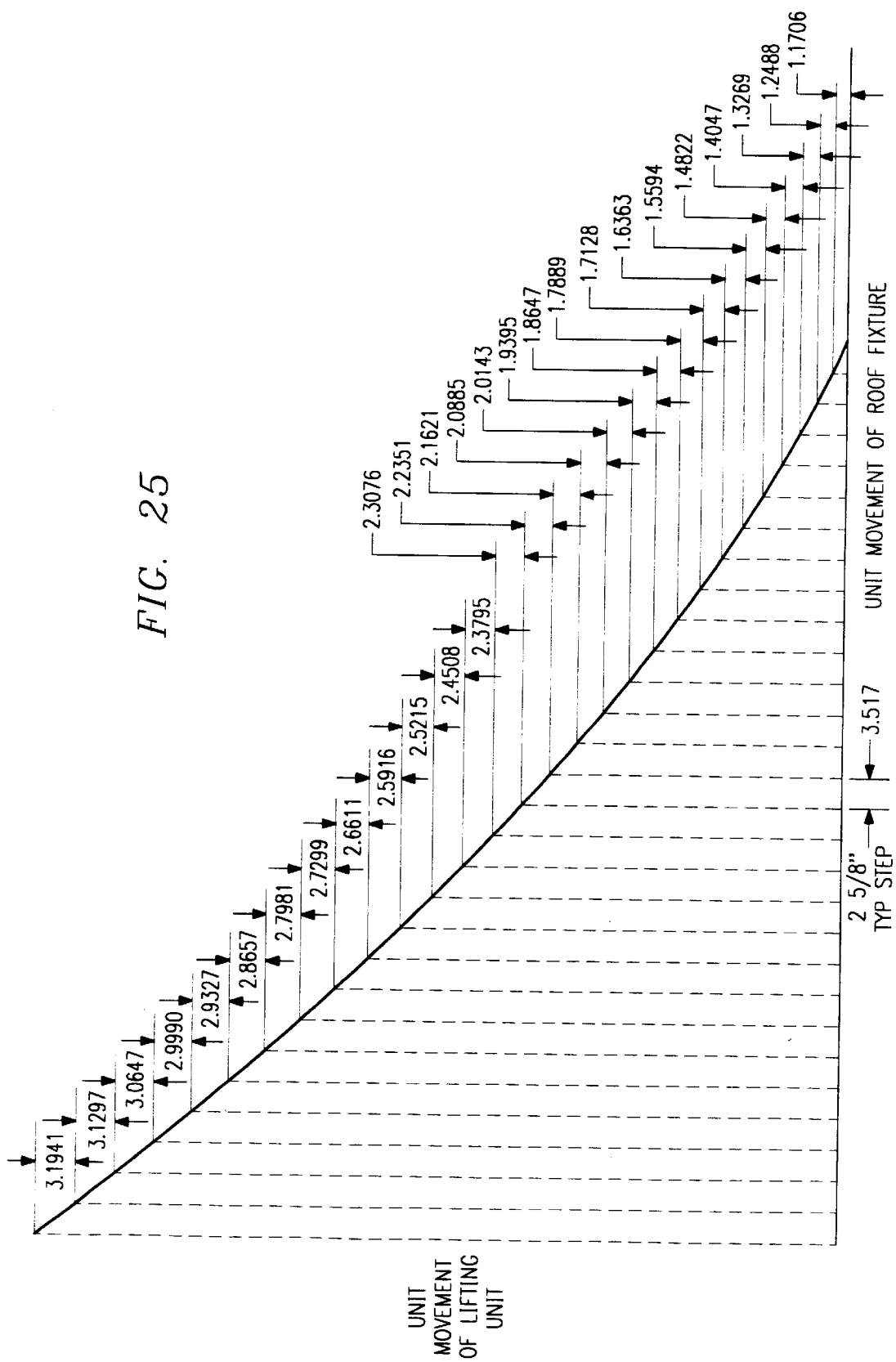
FIG. 25 is a schematic chart showing correlation between lift of an actuator with movement of the roof fixture for one embodiment of the present system according to an aspect of the present invention.

Referring to FIG. 25, an illustrative sequence of actuator unit with respect to unit of rotation for one embodiment is shown. The ordinate axis represents a unit of movement of the lifting unit or actuator 348 and the abscissa axis represents a unit of movement of the roof fixture. A computer, such as computer 240 of FIG. 5, may be programmed with such information along with the speed of the welding unit across member 290 of welding gantry 298 (FIG. 6) to determine the amount and rate of actuation required for actuator 348 to maintain the desired weld speed across the roof sheet and roof carline.

Figure 26:
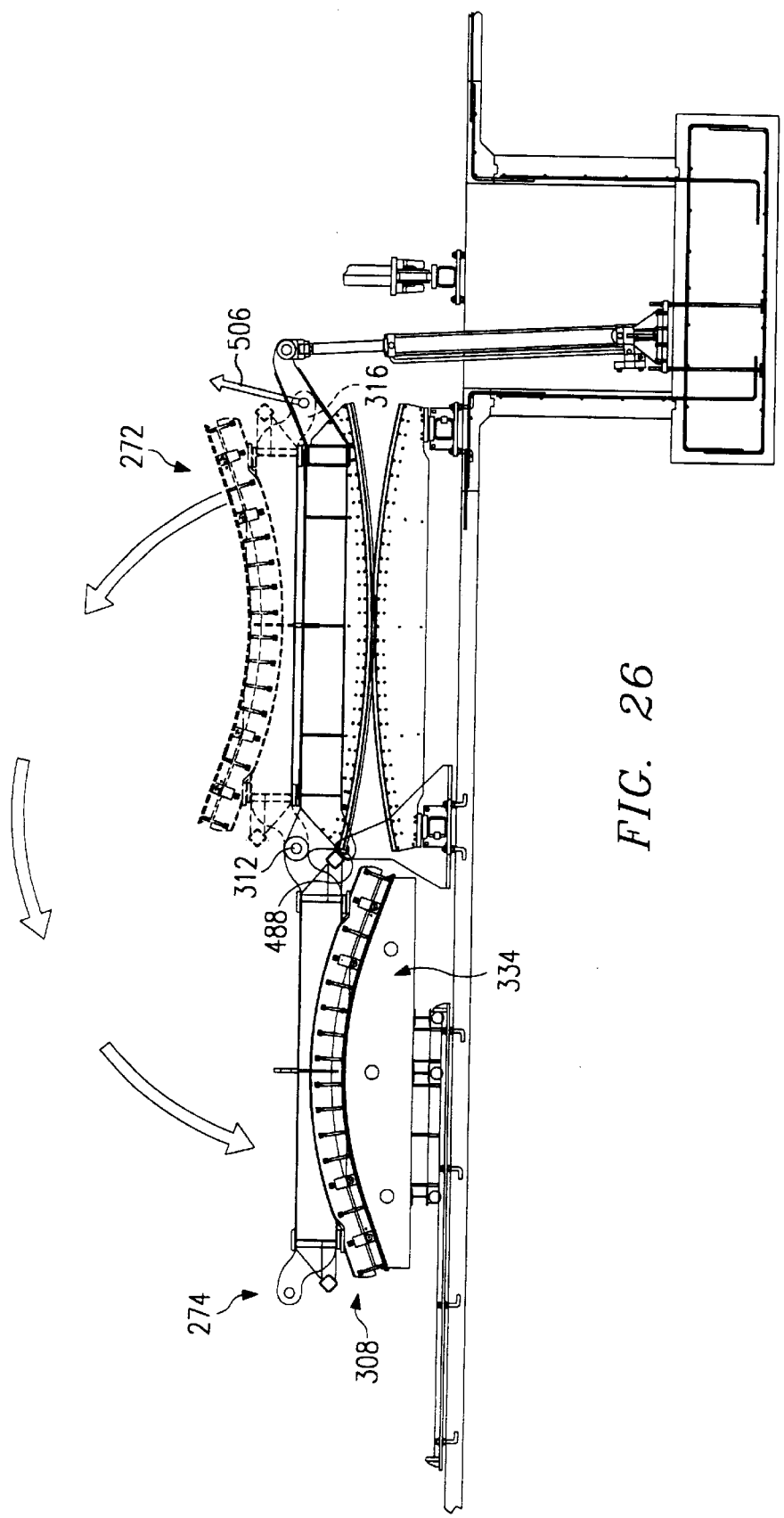
FIG. 26 is an end elevational view with portions removed showing transfer of a roof retainer frame from a welding station to a hatch installation station.

Referring now to FIG. 26, the unloading of roof sheet welding station or fixture 272 is shown with the roof being flipped about pivot point 312 over onto hatch installation station 274. To do this, locking pin 488 is removed, and any attachment or locking mechanism in aperture 318 is removed. A nylon strap or the like is attached to bell crank 316 on the side opposite of pivot point 312, and a force is applied to the nylon strap by an overhead crane as represented by arrow 506. The force is applied as shown by 506 to rotate the unit completely over onto roof retaining support stand 334 of station 374.

In one operation sequence, roof sheet welding station 272 is prepared by locking upper roof rocker base 300 in a fixed neutral position with respect to lower roof rocker 298 by use of locking pin 488, as shown in FIG. 6. Welding gantry 288 and clamping gantry 328 are moved to a clear or parked position, such as indicated by reference numeral 508 in FIG. 9. A roof retainer 308 is then loaded onto upper roof rocker base 300 and locked in place. Roof carlines are then loaded into roof retainer 308. The carline alignment-and-holding mechanisms 338 are used to align and hold the carlines in position.

Roof sheets, e.g., roof sheet 276 (FIG. 6), are loaded onto roof retainer frame 308 and placed between carlines with a portion of each roof sheet overlapping a lateral extension 283 of each carline 280 (see FIG. 15). In some instances, it may be desirable to weld a first roof sheet in before loading the others. Clamping gantry 328 may then be rolled along tracks 294 into position to weld a first roof sheet to a first roof carline. Clamping mechanism 364 may be actuated to cause clamping surfaces 466 to press roof sheet 276 against lateral extension 283 of carline 280 (see e.g., FIG. 18). The roof sheet may be tacked to the carline and any necessary run-out tabs (which are extra pieces of metal temporarily attached to allow a weld beyond what would otherwise be the edge) on the end of the carlines attached to facilitate welding. With the clamping gantry holding the roof sheet, the welding unit may be actuated with rotating unit 296 under computer control to accomplish the controlled welding process described above. Upon reaching the end of that particular roof sheet and carline connection, the clamping gantry and welding gantry 364 and 288 are moved to the next roof sheet and carline for welding on the same side of the carline (for example, all the B-sides may be done first). Once reaching the end of the roof, the welding unit may be reversed 180° and the orientation of the welder reconfigured for welding in the other direction (A-sides of each carline) on the other side of the carline. A second clamping gantry analogous to that shown in FIGS. 16 and 17, but oriented to clamp the other side of the roof sheet carline overlap may then be rolled into position. In a like manner, the welding process will continue for each weld in that direction.

Once the welding of each roof sheet to a carline is completed, rotating unit 296 may be rotated to a neutral position (FIG. 6) and locked in place with locking pin 488. The proper location of each hatch (e.g., 30 of FIGS. 1–3) may be located with chalk and a center punch for the center of each hatch made in the applicable roof sheet. Clamping gantry 328 and welding gantry 288 may be moved out of the way to park location 508 (FIG. 9) for unloading of roof retainer frame 308. As discussed in connection with FIG. 26, roof retainer 308 is rotated about pivot point 312 onto roof retainer support stand 334. Once the rotation is completed, pin 312 may be removed and retainer support stand 334 moved away from welding station 272 and over to hatch installation station 274. Retainer 308 may be locked to stand 334 using pins.

At roof installation station 274, the full hatch openings may be marked or otherwise indicated on the roof. The cutting process may then be initiated with a plasma torch or other cutting apparatus using the center punch previously located. Once the holes for the hatches are made, hatch rings may be inserted and attached with other hatch components. Upon completion, roof retainer rack 308 may be unlocked from roof retainer support stand 334 and moved to another location to be assembled onto a body of a railcar. The roof, along with the roof retainer, may be moved to a main assembly subsystem at this point (e.g., 168 of FIG. 4).

III. Center Partition Assembly System and Method

Figure 27:
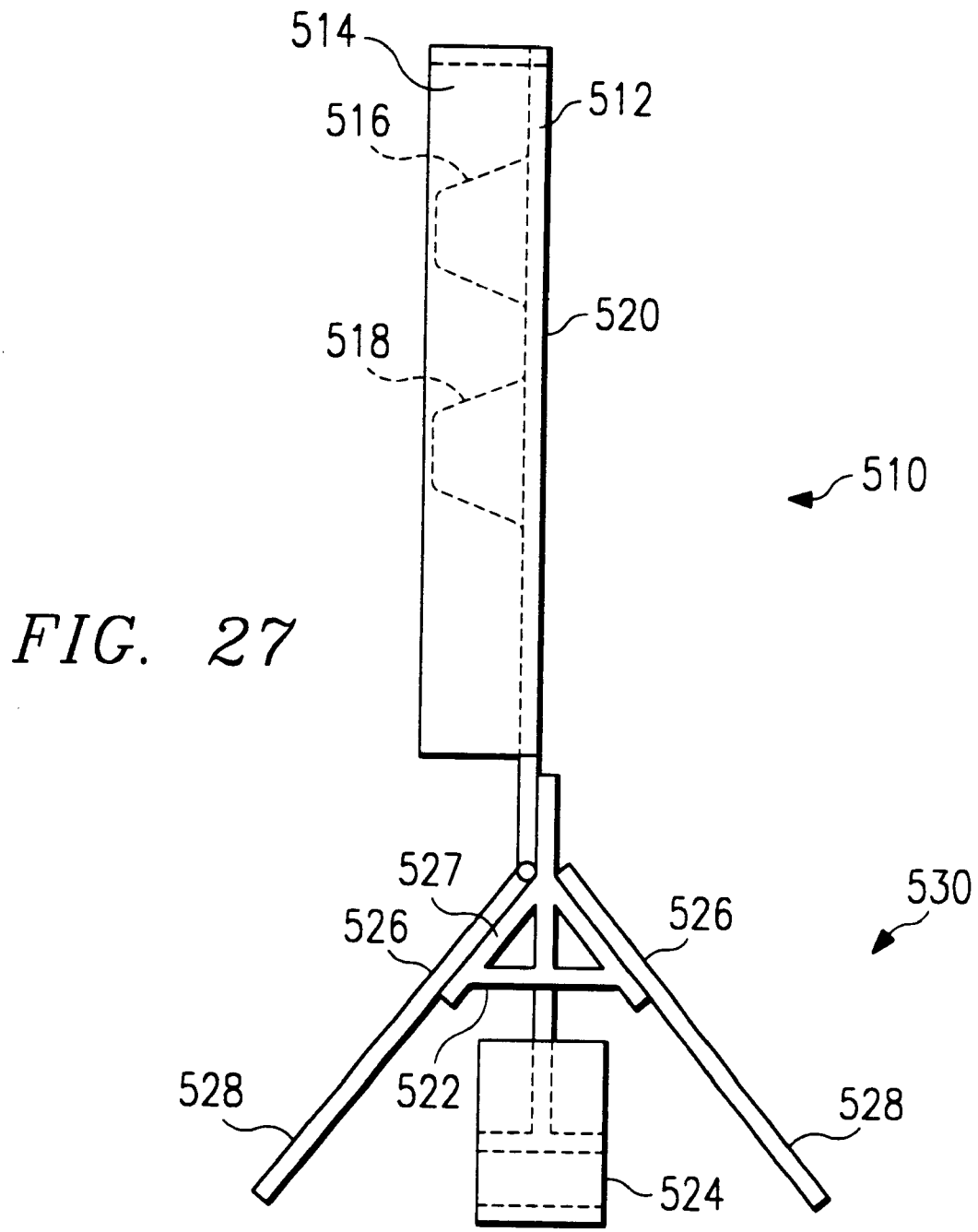
FIG. 27 is a schematic side elevational view of a center partition according to an aspect of the present invention.
Figure 28:
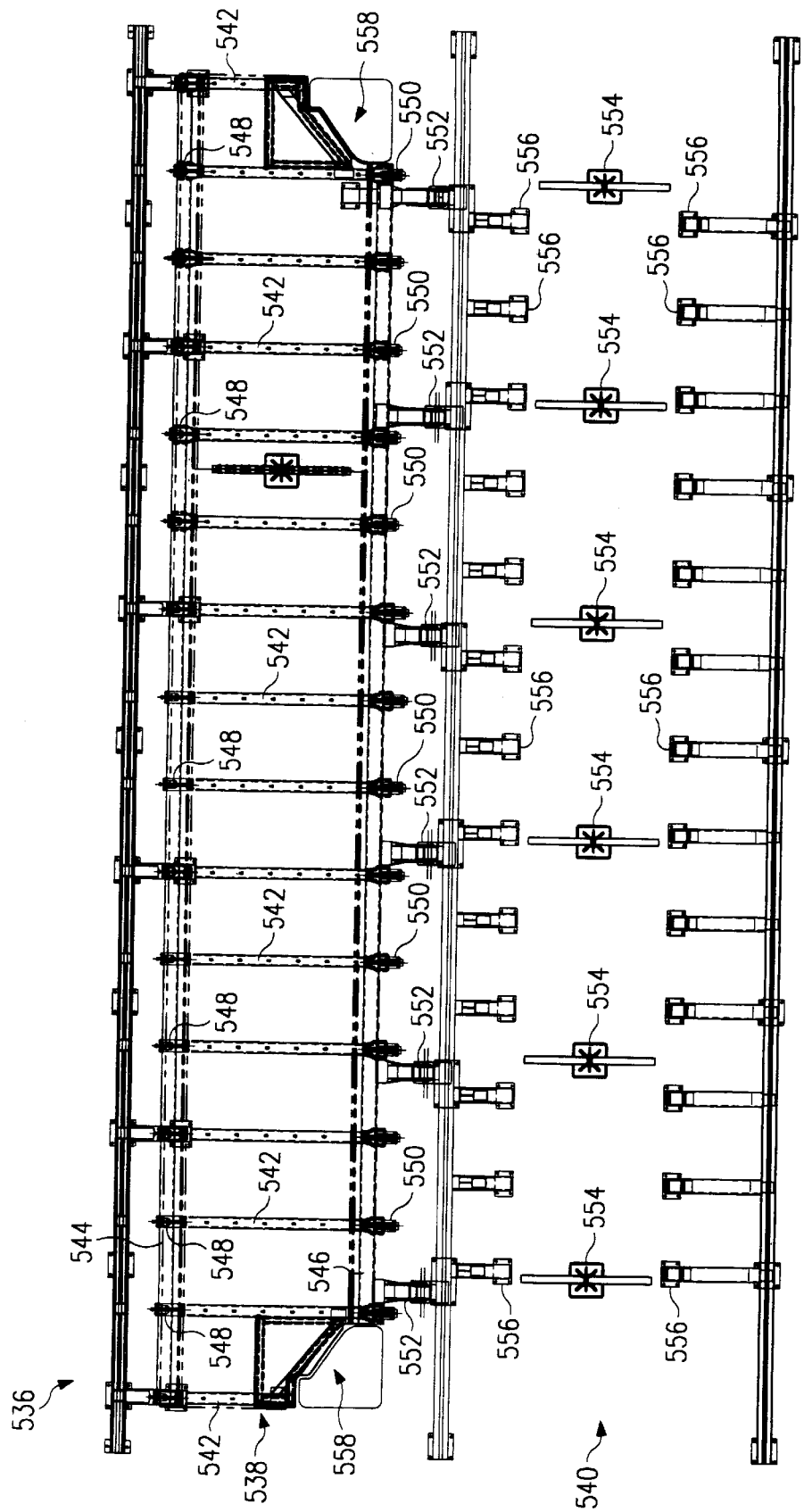
FIG. 28 is a schematic plan view of a side sheet assembly fixture.

As an aspect of manufacturing railcar 10 of FIG. 1, three center partitions 86 are fabricated. Center partitions 86 may be fabricated and then taken to a main assembly fixture as an aspect of producing a completed body 12. A schematic diagram of a center partition assembly 510 is shown in FIG. 27. In this side view, it can be seen that center partition 510 has a vertical sheet portion 512 and a flange portion 514. Flange 514 will rest against an interior portion of side sheet assembly 18 (FIG. 1). Stiffeners 516 and 518 may be attached laterally or transversely across vertical sheet 512. Vertical sheet 512 with flange 514 and stiffeners 516 and 518 make up an upper portion 520 of center partition 510.

Extending below flange 514, vertical sheet 512 is coupled with a support member 522, which is also referred to as a "Christmas tree" member. Connected from a portion of Christmas tree 522 is a mounting bracket 524 for mounting to a side portion of the car. On a sloped portion of Christmas tree 522, sloped center partition sheets 526 are attached. A lower portion of the center partition slope sheets 526 may form a sloped hopper sheet 528, which will form a portion of the hopper chute. Christmas tree 522, bracket 524, and slope sheets 526 comprise a lower portion 530 of center partition 510.

In a preferred embodiment, center partition 510 is made entirely of aluminum alloy. Therefore, a fixture may be used to hold components of center partition 510 while they are rotated and welded with a welding plane perpendicular to the gravity field. According to one technique, flange 514 and vertical sheet 512 may first be assembled in a frame. Christmas tree 522 may then be loaded into a fixture for holding it and vertical sheet 512 and flange 514. Locator pins may be used with Christmas tree 522 to precisely locate it. Christmas tree 522 may then be welded to a lower portion of vertical sheet 512. Stiffeners 516 and 518 may then be loaded into a fixture for holding them against vertical sheet 512. Stiffeners 516 and 518 may be clamped to vertical sheet 512 using expanding air bag clamps, which will be described further below as an aspect of the main assembly fixture. Stiffeners 516 and 518 may then be welded to vertical sheet 520. Afterwards, the air bags may release the clamping force.

The center partition at that point may be loaded into another fixture if desired, that will allow full rotation for purposes of completing welding out of the partition. Starting with it in the vertical position, sheets 526 may be placed against angled portions 527 of Christmas tree 522. After tack welding the sheets, the unit may be rotated to allow welding at the desired alignment for the aluminum alloy weld, which is with a welding plane or surface being welded is substantially perpendicular to the gravity field, i.e., horizontal. A number of other components such as reinforcement pads and the like may be added to enhance center partition 510. Once completed, center partition 510 is moved to the main assembly subsystem (e.g., 168 of FIG. 4).

IV. Side Panel Assembly System and Method

In order to construct a car like car 10 of FIG. 1, and more particularly body 12, side sheet assemblies 18 are manufactured. Once side assembly 18 is manufactured, it will be taken to the main assembly fixture where body 12 will be completed or substantially completed. Because the size of the car, it is not convenient to obtain a complete aluminum alloy sheet the necessary size, and therefore, a long side sheet and a short side sheet are combined. A table or fixture for manufacturing the side assembly may be used. For example, side assembly fixture 536 of FIG. 28 may be used.

Side assembly fixture 536 has a first portion or station 538 and a second portion or station 540. At station 538, a number of lateral supports 542 support the side sheets while they are attached to each other, and a first longitudinal beam 544 and second longitudinal beam 546 provide complimentary components for completing the frame for holding the side assembly. Beam 544 provides a location for receiving and holding top chord or P-chord to be attached to the side assembly. It may be held against the side sheets by a plurality of clamps 548. Longitudinal beam 546 also provides a place for holding and for supporting the bottom chord of the side assembly. The bottom chord may be held to the side sheet by a plurality of clamps 550. The P-chord and bottom chord may be attached to the side sheets at station 538. The portion of the frame made up of beam 544, beam 546 and transverse or lateral members 542 may then be rotated about a number of pivoted extensions 552 over to station 540.

Station 540 has center support stands 554 and side support members 556 to support the side assembly while the opposite side from that welded at station 538 is then welded. Other side assembly fixture designs may readily be used.

In using fixture 536, the short side sheet and long side sheet are first loaded at station 538. The two side sheet components are then butt welded. The corner pieces shown at reference numeral 558 may then be cut with a plasma torch and template. The P-chord may then be loaded into fixture 536 along beam 534. The P-chord may then be clamped into place using clamping devices 548. The side sill or bottom chord may then be loaded onto beam 546 and clamped with clamps 550. The P-chord may then be welded to the side sheets at their joint, and then the bottom chord may be welded to the side sheets in a similar manner. The pivotable frame at station 538 may then be rotated about rotatable extensions or pivotable extensions 552 using an overhead crane to set the assembly down on secondary station 540. In a manner similar to that of station 538, the P-chord and bottom chord may be clamped into position and welded on the opposite side from the welding that occurred at station 538. The side assembly may then be removed and is ready for installment at a main assembly fixture.

V. End Assembly System and Method

Figure 29:
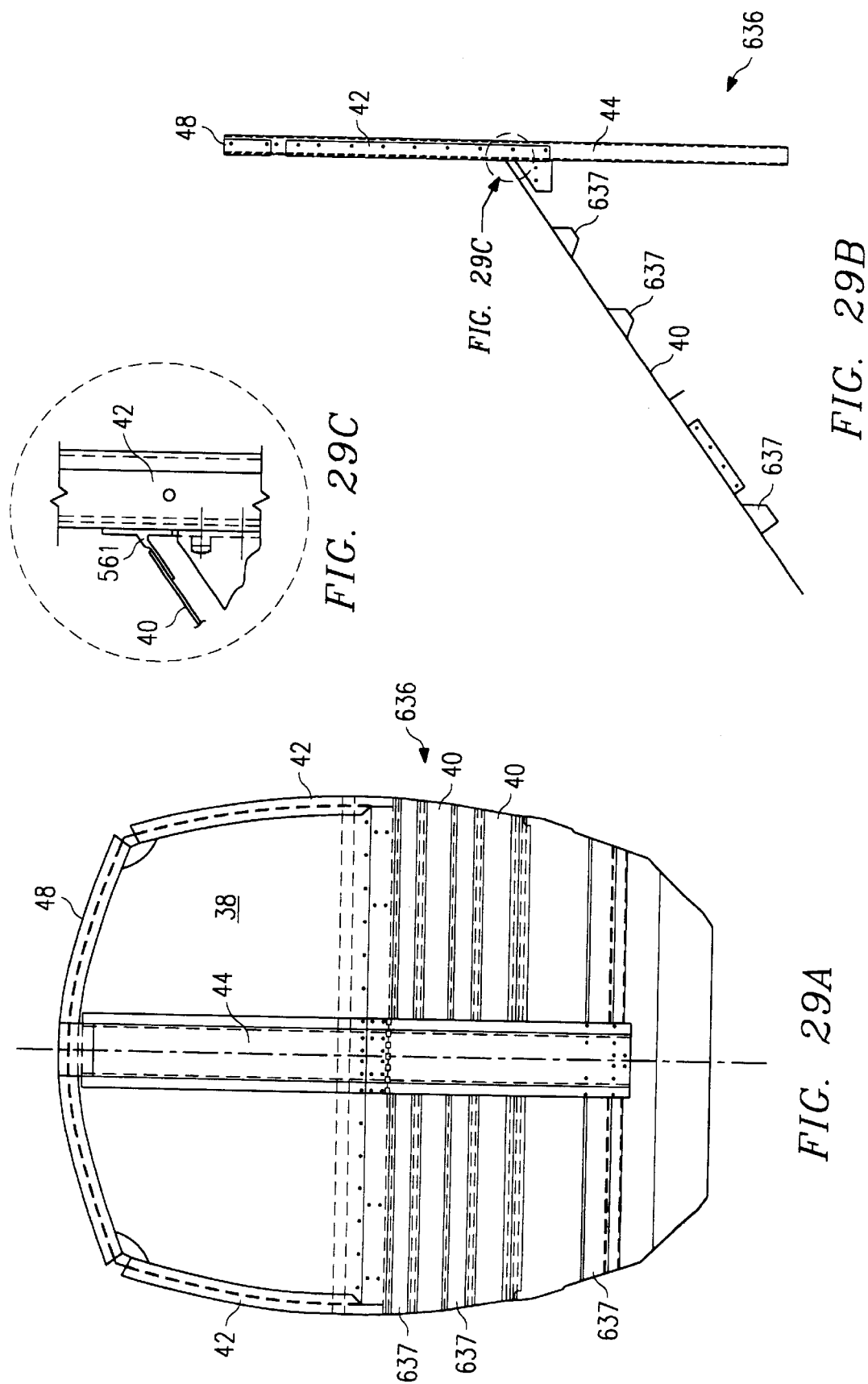
FIG. 29A is an end view in elevation of an end assembly.
FIG. 29B is a side view in elevation of the end assembly of FIG. 29A.
FIG. 29C is a detail of a portion of the end assembly of FIG. 29B.
Figure 34:
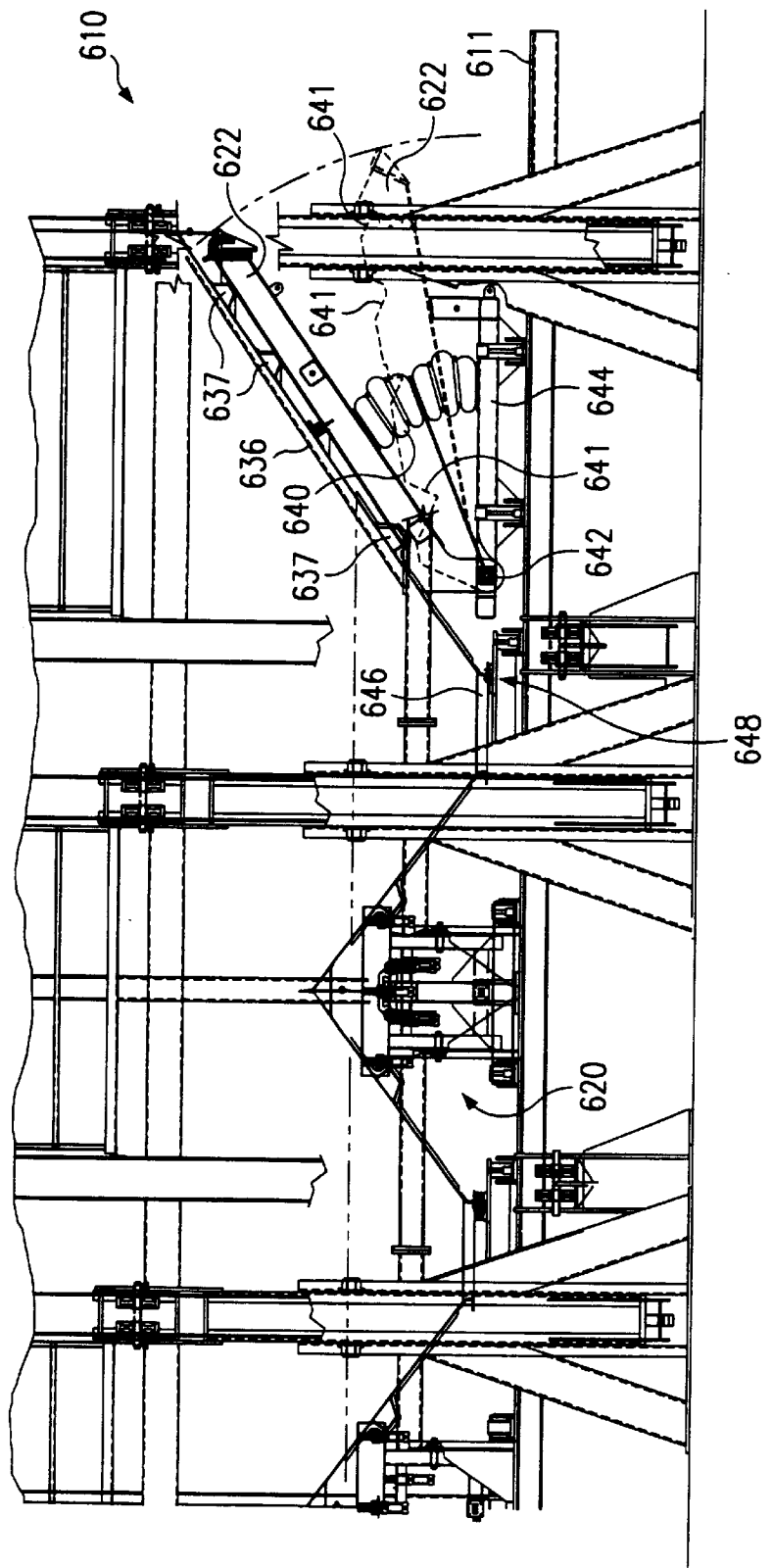
FIG. 34 is a side elevational view of a portion of a main assembly fixture showing an end assembly clamping arm.

In manufacturing car 10 of FIG. 1, end assembly 20 is preferably manufactured or assembled before being applied to body 12 in a main assembly fixture. Illustrative end assemblies are shown in FIGS. 1, 29, and 34. Referring to FIGS. 1 and 29, end assembly 20, 636 includes an end sheet 38, corner post members 42, bolster post 44, a sloped end sheet 40, and stiffeners 96, 637. Cross member 95 may be included at one portion of the sloped sheet.

The end assembly may be manufactured with an end assembly fixture similar to that described in connection with the center partition. The end sheets are loaded, and then a support member or T extrusion 561 (FIG. 29) may be placed in the fixture at a splice position up between the sheets. One or more locating pins may be used to help align the T extrusion 561. Once aligned, the extrusion may be held in place by clamping air bags that may be actuated to clamp extrusion 561 into place on the slope sheets. A welding gantry may be moved over the joint and welded. Stiffener members 637 (FIG. 29) may then be put into place and clamped and welded. Then the end sheet assembly, which includes a flange (e.g., members 42 and 48) and end sheet 38 with bolster post 44 may be brought in to the fixture and placed with a portion of sheet 38 against T extrusion 561. When this welding process is completed, the end assembly is complete and may be moved to the main assembly fixture.

VI. Other Components

Before going to the main assembly fixture to assemble body 12 (FIG. 1), a number of additional components may need to be manufactured. For example, gate frames 92 may be manufactured. Additionally, side hopper sheets 94 need to be cut and prepared for assembly. These components are manufactured and taken to the main assembly fixture.

VII. Main Assembly System and Method

The main assembly fixture carries out two main functions. First, it allows the parts, which may be aluminum alloy and not have a lot of inherent strength alone, to be held into position adequately while they are attached to form body 12. Additionally, the main assembly fixture allows for the components of the body to be rotated so that welding may generally be accomplished with the preferred orientation for aluminum alloy, i.e., such that the welding plane is perpendicular to the gravity field, i.e., horizontal. As will be presented in the figures and discussion below, a "clam shell" or squeeze-like device may be used to receive all of the various components, be closed to hold them together, and then rotated 3600 so that different components may be welded with the desired orientation. This may be carried out in a number of different ways with many alternatives, but one illustrative embodiment will be presented in connection with FIGS. 30–40.

Figure 30:
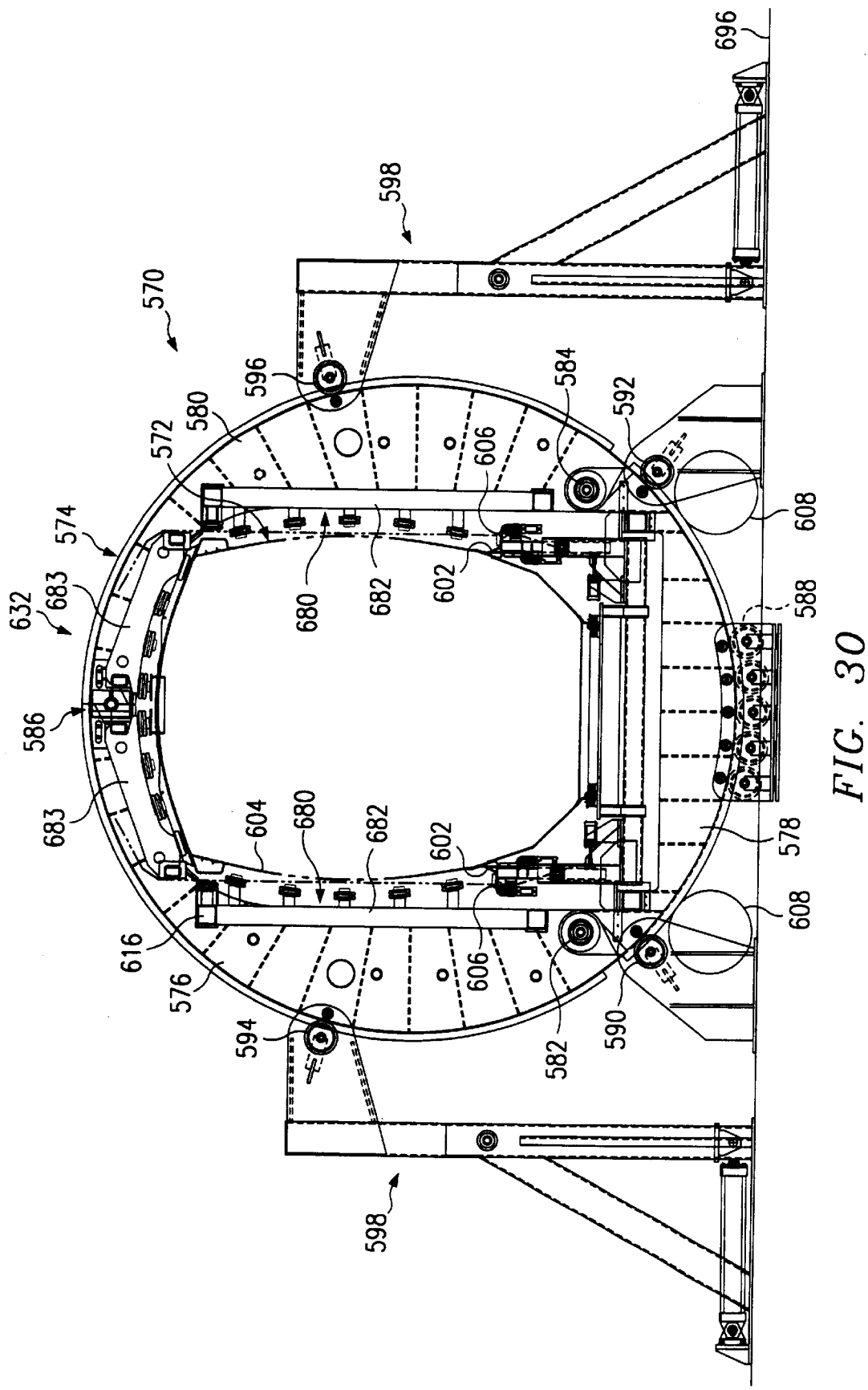
FIG. 30 is an elevational end view of the main assembly fixture according to an aspect of the present invention in a closed position.
Figure 31:
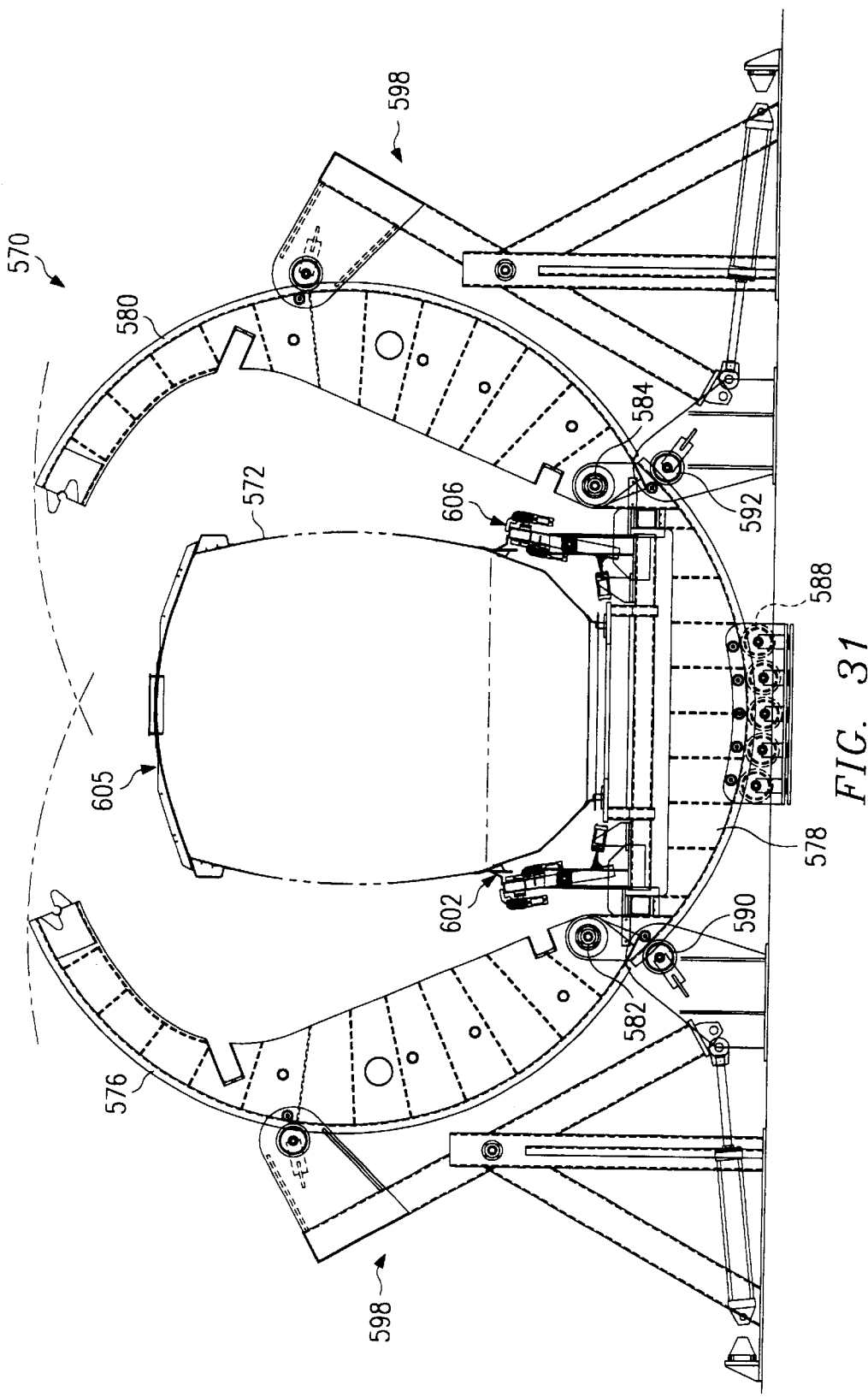
FIG. 31 is an elevational end view of the main assembly fixture (with portions broken away) according to an aspect of the present invention in an open position.
Figure 32:
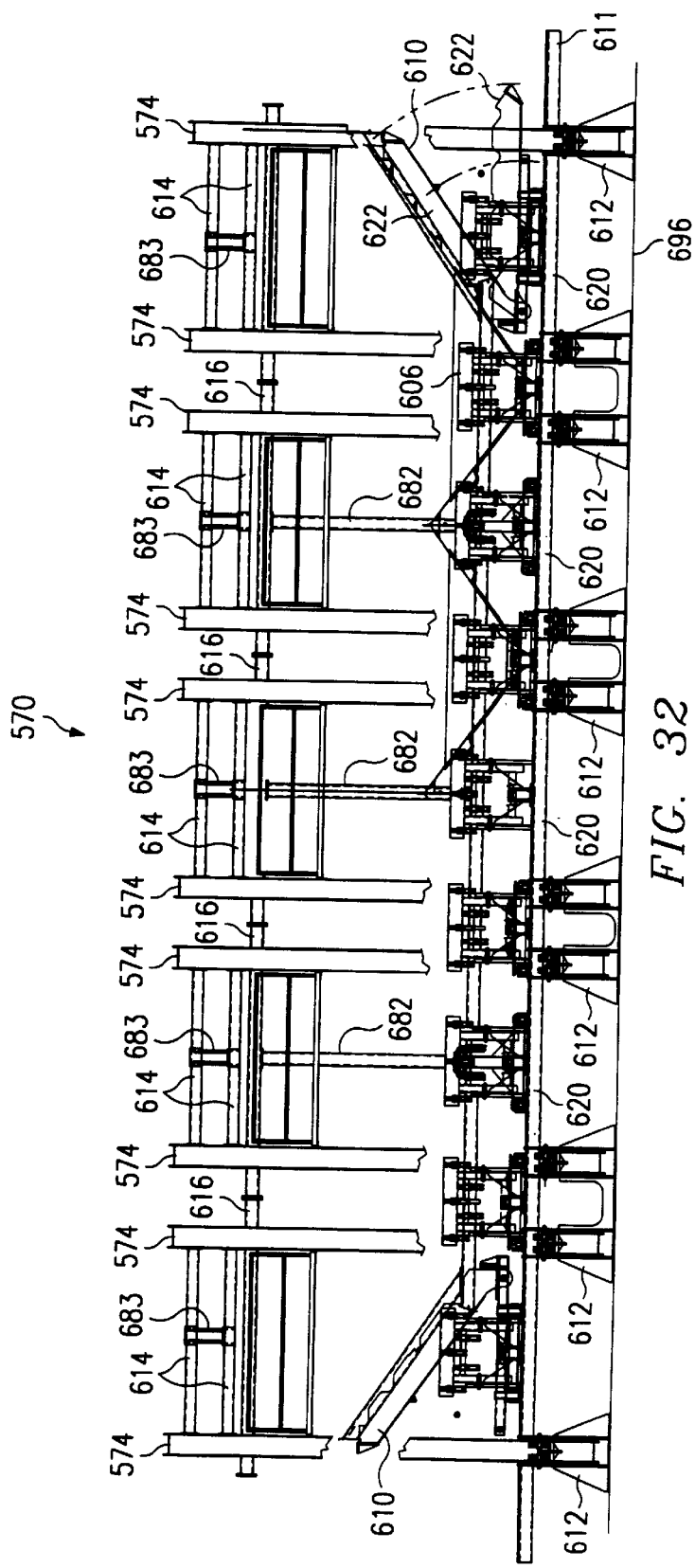
FIG. 32 is a side elevational view of a main assembly fixture (with portions broken away) according to an aspect of the present invention.

Referring to FIGS. 30 and 31, an end view of main assembly fixture 570 is shown in a closed position and open is position, respectively. FIG. 32 shows a side elevation view of main assembly fixture 570. A representative car body 572 is shown in main assembly fixture 570 in FIGS. 30 and 31. Roof 605 is shown on body 572.

Referring to FIG. 30, a ring 574 of fixture 570 is shown in a closed position. Ring 574 holds car 572 during welding and allows for the rotation of ring 574 within fixture 570, as will be explained below. Ring 574 has a first ring member 576, a second ring member 578, and a third ring member 580. First ring member 576 is pivotally coupled to second ring member 578 at pivot connection 582. Similarly, third ring member 580 is pivotally coupled to second ring member 578 at pivot connection 584. First ring member 576 may be coupled temporarily to third ring member 580 by locking mechanism 586, as will be described further below. Ring 574 is supported by a plurality of rollers including bottom rollers 588 and rollers 590 and 592. Further stability is provided by rollers 594 and 596 on squeeze units 598. As shown in FIG. 31, when squeeze members 598 are moved to an open position while locking mechanism 586 is in the unlocked position, first ring member 576 and third ring member 580 will move apart from each other as shown. This open position is used for loading and unloading of car body 572.

As shown in FIGS. 30 and 31, bottom chord 602 of side assembly 604 is positioned in a bottom chord clamping mechanism 606. Clamping mechanism 606 holds and supports the bottom chord during loading of fixture 570 and assembly.

Rollers 594, 590, 588, 592 and 596 allow rings 574 to rotate into position with car body 572 therein. This allows the rings to be stopped at different positions to allow welding with the weld plane substantially perpendicular to the gravity field. The motive force for rotating ring member 574 of main assembly fixture 572 may be accomplished with a chain and sprocket arrangement as will be described further below. Sprockets 608 are shown in FIG. 30. Teeth may be mounted on ring 574 or other ring to interface with the chain.

Referring to FIG. 32, main assembly fixture 570 includes a plurality of rings 574. It can also be seen that a plurality of bottom chord clamping mechanisms 606 are placed along fixture 570. At each end, an end assembly clamping mechanism 610 is provided for positioning the end assembly as an aspect of the operation of fixture 570. Fixture 570 is supported by a plurality of floor supports 612. Rings 574 are preferably grouped in pairs with cross members 614 between pairs. Cross members 616 may be placed between adjacent pairs of rings 574. Center partition floor sheet supporting and clamping mechanism 620 is also shown. Fixture 570 includes a fixture support floor member 611.

Clamping support bar 622 of end assembly clamping mechanism 610 is shown both in the opened or flat position and in the clamping or closed position. It may be moved between positions by the selective activation of air bags.

Figure 33:
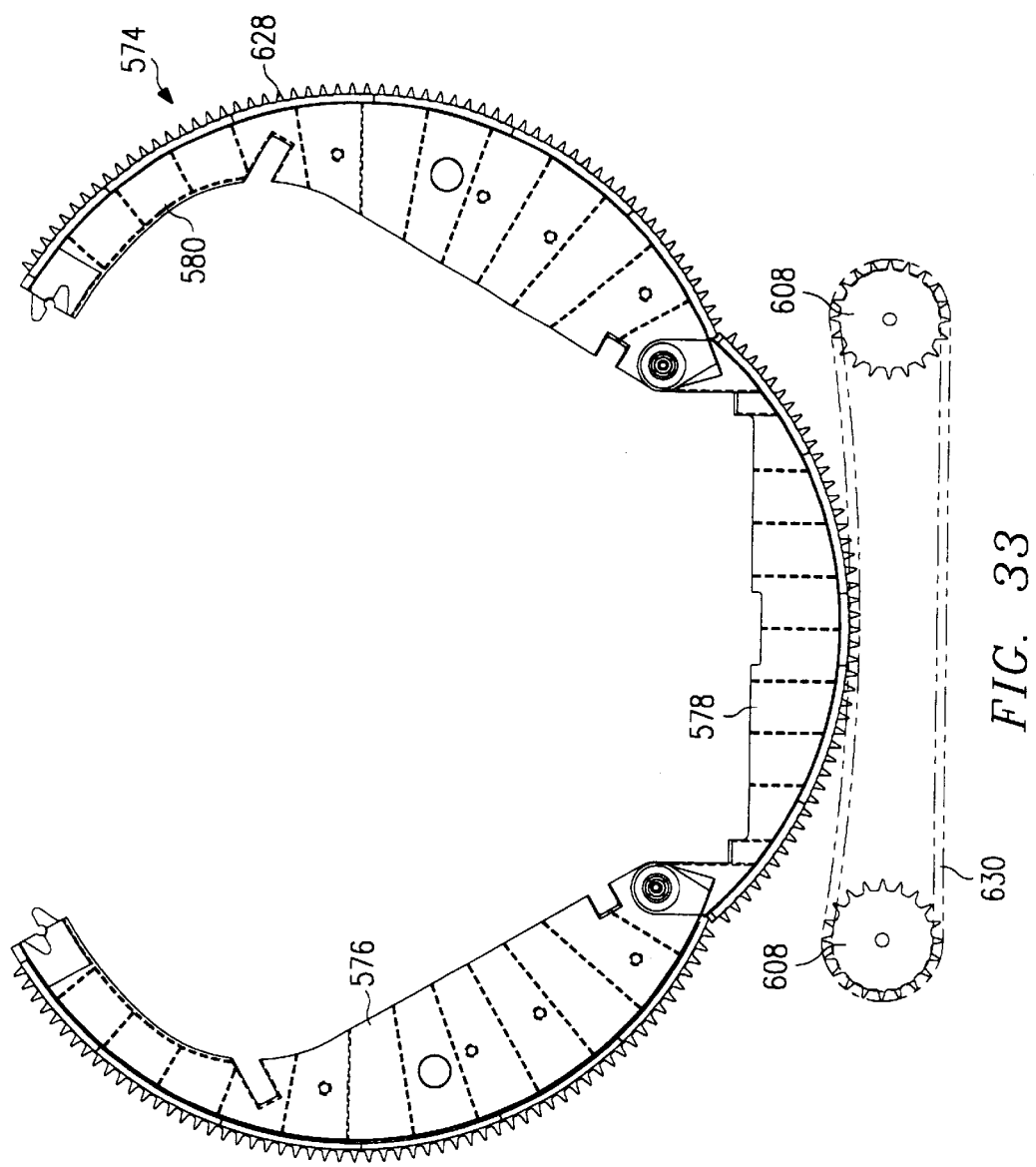
FIG. 33 is a schematic diagram of a ring used to drive the rotating cage according to an aspect of the present invention.

Referring to FIG. 33, ring 574 is shown adapted with teeth 628 suitable for mating with chain 630 which is retained on sprockets 608. One of sprockets 608 may be selectively powered by a motor which will cause chain 630 to move, and because the interface of teeth 628 with chain 630, to cause ring 574 to move. Because of the interconnection of rings 574, the entire rotating cage or portion 632 (FIG. 30) rotates. Fixture 570 may include one or more such chain-and-sprocket arrangements and preferably includes two.

Referring now to FIG. 34, a detailed portion of fixture 570 is shown with some portions broken away. End assembly clamping mechanism 610 is shown in more detail. Mechanism 610 is shown supporting end assembly 636 of car body 572. Clamping arm 622 is shown in its clamping position and in broken lines in a loading position. End assembly 636 includes stiffeners 637. Clamping arm 622 is formed with notches 641, sized and configured to receive and hold stiffeners 637 when pressing end assembly 636 into position for attachment to body 572. Airbags 640 apply a clamping force to arm 622. Arm 622 pivots about a pivot point 642. Pivot point 642 is on a support member 644 mounted above fixture floor 611.

Hopper gate or discharge gate 646 is shown placed on gate-frame-alignment-and-holding station 648. Station 648 is mounted above fixture floor 611.

Figures 35, 36:
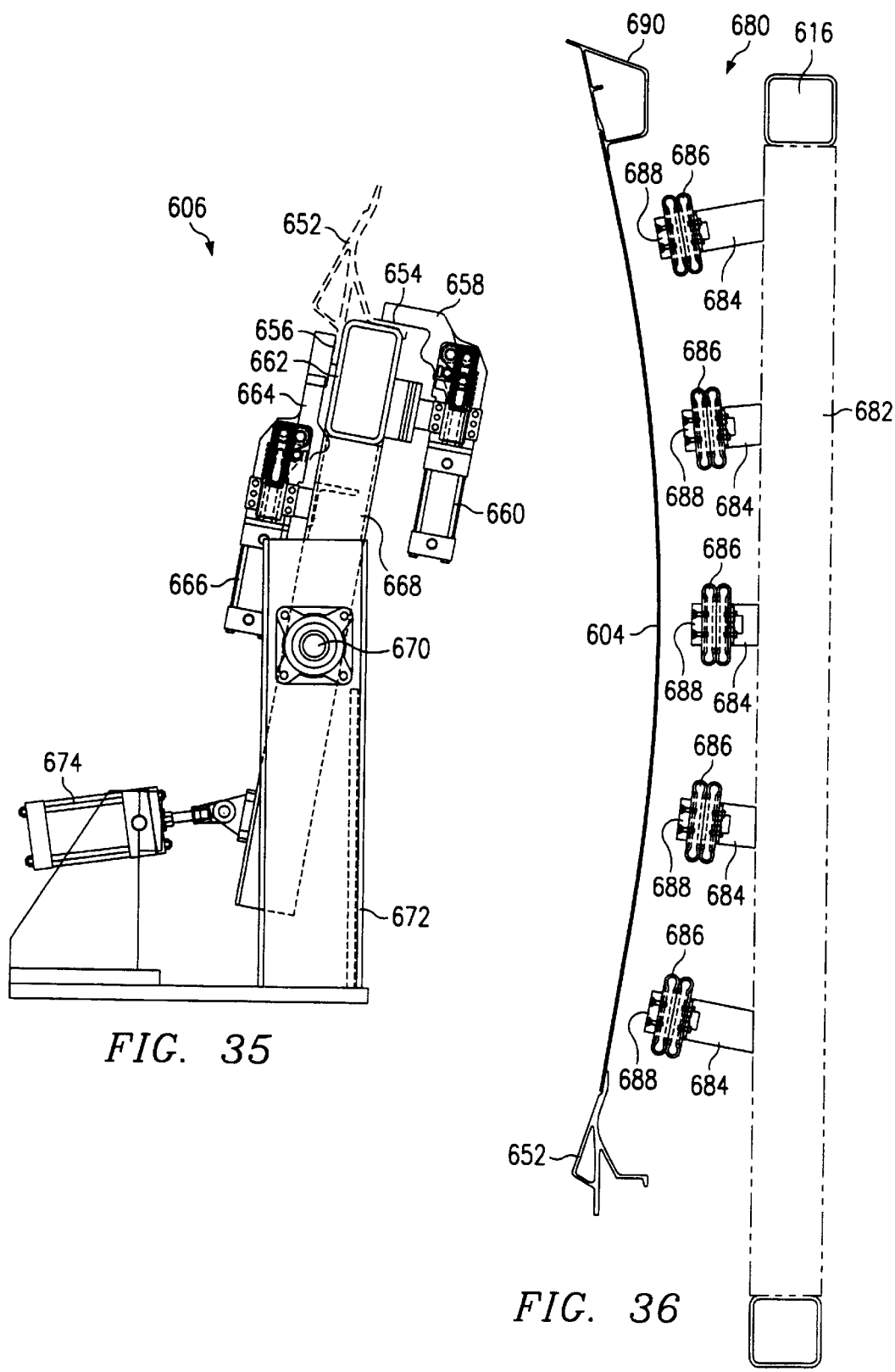
FIG. 35 is an elevational view of a bottom chord clamping mechanism according to an aspect of the present invention.
FIG. 36 is a side elevational view of a vertical-compression member according to an aspect of the present invention.

Referring now to FIG. 35, a bottom-chord-clamping mechanism 606 is presented. Clamping mechanism 606 is shown clamping bottom chord 652. Mechanism 606 has two clamping surfaces 654 and 656. Clamping surface 654 is actuated as part of a pivoting arm 658 that is selectively actuated by actuator 660 to cause a clamping force between surface 654 and rectangular member 662. Similarly, surface 656 is caused to clamp against rectangular member 662 under the influence of pivoting arm 664. Pivoting arm 664 is caused to pivot and thereby apply the clamping force under the action of actuator 666. Actuators 666 and 660 and their pivot arms 654 and 658 are attached to a pivotable positioning arm 668, which is connected at pivot point 670 to a support frame 672. Pivotable positioning arm 668 is caused to pivot about point 670 in response to forces developed by actuator 674. Actuator 674 is shown in a retracted position causing clamping surfaces 654 and 656 to be away from the position where bottom chord 652 would be during assembly of body 572, but when actuator 674 extends it will cause bottom chord 652 to move into correct position. The operation of mechanism 606 as a part of fixture 570 will be described further below.

Referring now to FIGS. 32 & 36, vertical-compression member 680 and horizontal compression member 683 are shown. Vertical-compression member 680 may be applied to an internal portion of a ring 574 or may be a separate attached member, such as vertical member 682 shown in FIG. 32. Vertical-compression member 680 includes a vertical member 682 having compression pedestals 684 extending from it. Pedestals 684 may be of different lengths. At the end of each pedestal 684 is a selectively-activated compression unit 686, which preferably includes inflatable airbags. Each compression unit 686 has a clamping or compression surface 688. As is suggested in FIG. 36 by the location of side assembly 604 (P-chord 690 and bottom chord 652 are shown as part of 604), vertical-compression members 680 are used to compress side assembly 604 to have the desired curved or arced profile. The airbags of compression units 686 allow for the variations in side assembly 604 without damaging the aluminum alloy which is used preferably for side assembly 604. Compression members 680 are supported on internal walls of rotating cage 632 of fixture 570. While vertical-compression member 680 is described as being vertical, it may also be angled or slanted to accommodate applying pressure to the side assembly in the area of the end sheet. Although horizontal compression member 683 is not shown in detail, the function and components of horizontal compression member 683 are essentially identical to vertical compression member 680. Horizontal compression member 683 differs from vertical compression member 680 in shape and size, and horizontal compression member 683 is approximately horizontal. Any number or orientation of compression units 686 may be utilized to support a railcar, within the teachings of the present invention.

Figure 38:
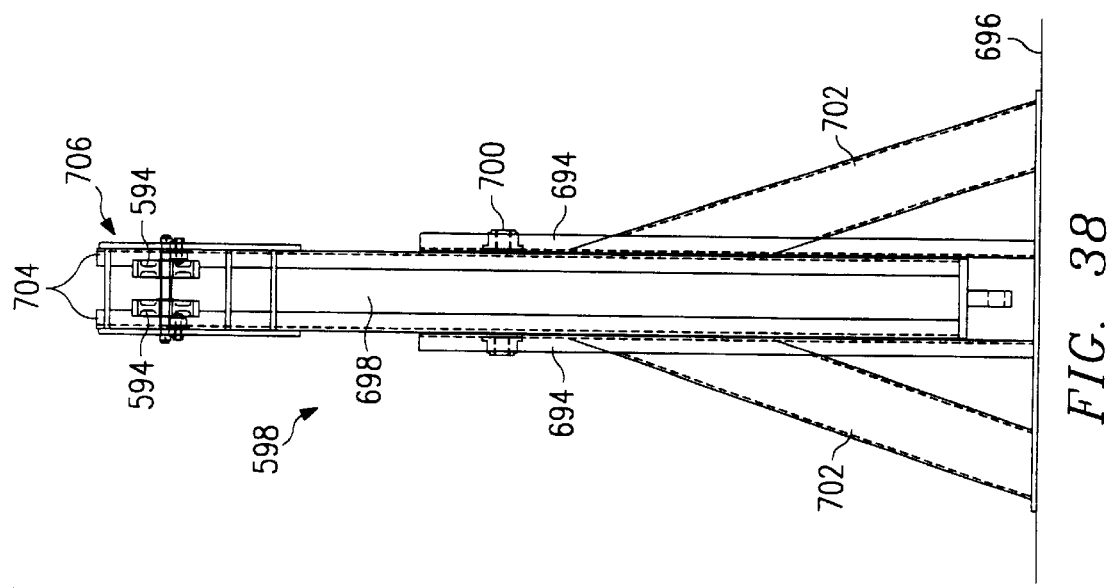
FIG. 38 is an elevational view of a squeeze unit for use with a main assembly fixture according to an aspect of the present invention.
Figure 37:
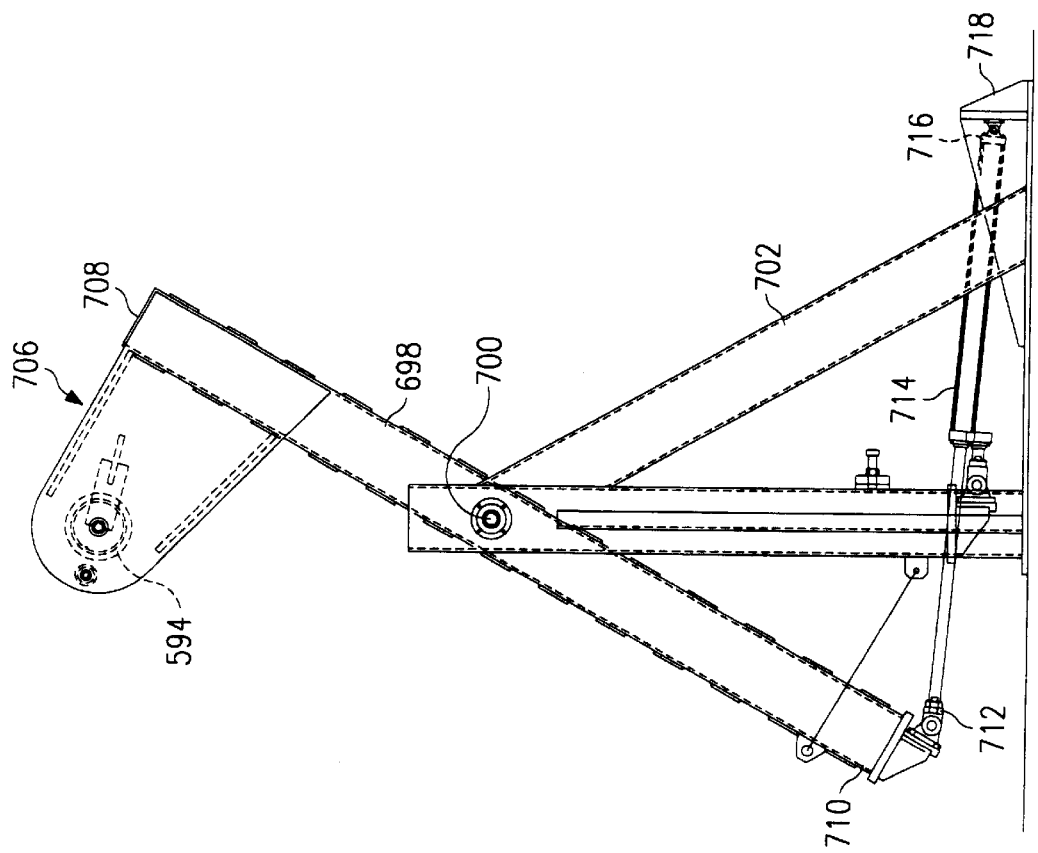
FIG. 37 is an elevational view of a squeeze unit for use with a main assembly fixture according to an aspect of the present invention.

Referring now to FIGS. 37 and 38, squeeze mechanism or unit 598 is shown in more detail. Unit 598 has two post members 694 mounted on shop floor 696. A pivot arm 698 is mounted between posts 694 by a pivotable connection 700. Additional support is given to posts 694 by support members 702. Rollers 594 are located between two members 704 that form a compression head 706. Compression head 706 is located on a first end 708 of pivot arm 698. On a second end 710 of arm 698, a first end 712 of an actuator 714 may be coupled. Second end 716 of actuator 714 may be anchored by an anchor bracket 718. As actuator 714 extends or moves away from second end 716, it causes compression head 706 on the end of pivot arm 698 to move outward or away from ring 574. When actuator 714 retracts, it moves compression head 706 towards ring 574. Thus, squeeze unit 572 may selectively apply or remove compression pressure to ring 574.

Figure 39:
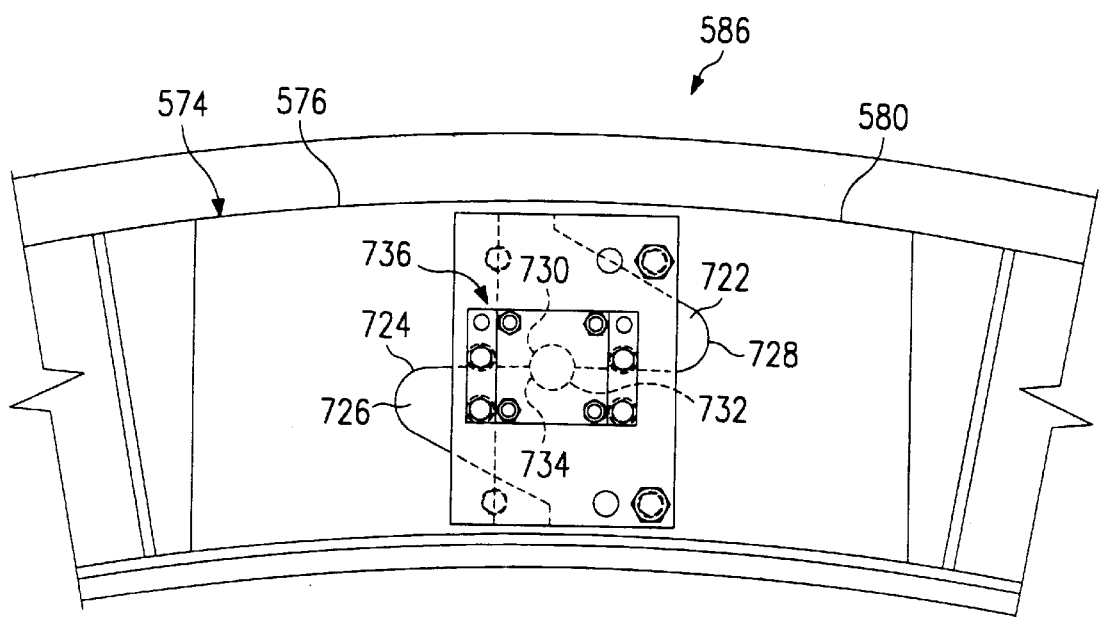
FIG. 39 is a side elevational view of a locking mechanism for use with a main assembly fixture according to an aspect of the present invention.

Referring now to FIG. 39, a more detailed drawing of locking mechanism 586 is shown. First ring portion 576 is shown having a projection 722 and a receptacle 724. In an analogous and coordinated fashion, third ring portion 580 has a projection 726 and a receptacle 728. Projections 722 and 726 mate with receptacles 724 and 728 to form an interlocked, distorted z-shape of surfaces bearing against one another. A hemisphere 730 is formed in projection 722 and a corresponding hemisphere 732 is formed in projection 726. When a pin is placed in aperture 734, which results from the alignment of hemispheres 730 and 732, it will lock first ring portion 576 to third ring portion 580. The distorted-z configuration of mating projections 722 and 726 allows only translation across aperture 724 and translation is effectively prevented when a pin is placed therein. A pin actuator unit 736 is placed on one side of aperture 734 to selectively place a pin or pins into the aperture.

Figure 40:
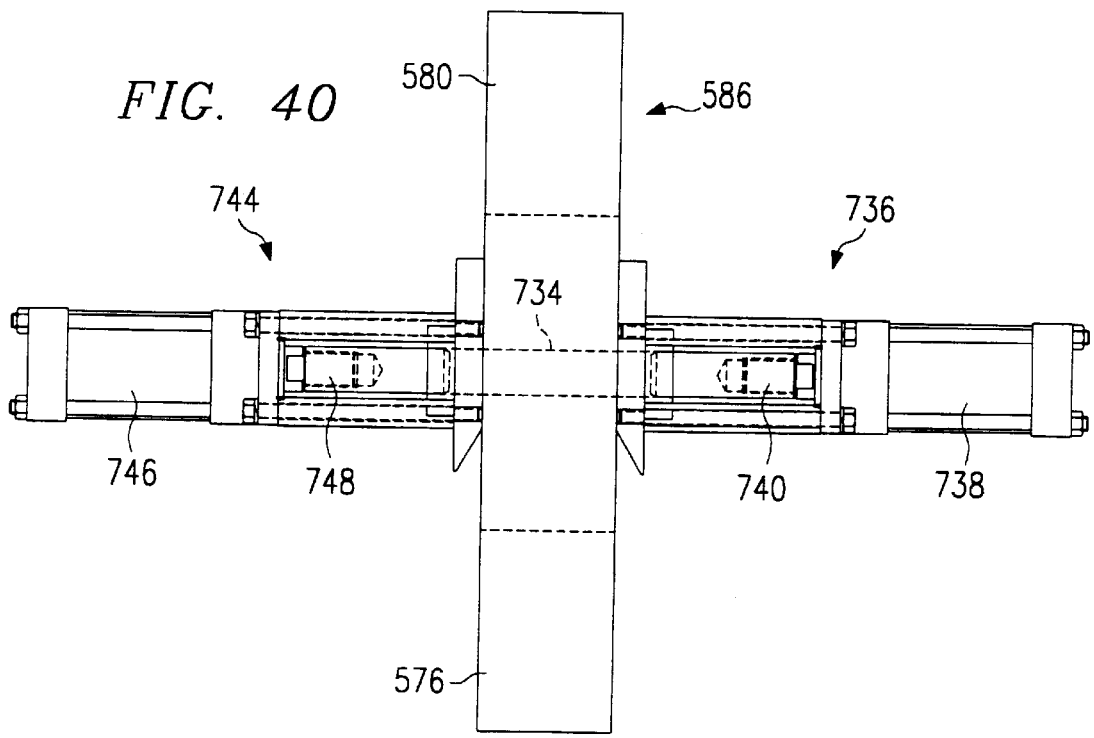
FIG. 40 is a plan view of the locking mechanism of FIG. 39.

Referring to FIG. 40, pin actuator unit 736 includes an actuator 738 that will force a pin 740 into aperture 734. Pin actuator unit 736 is shown with pin 740 in the retracted position or unlocked position. In the preferred embodiment of locking mechanism 586, a second pin actuator unit 744 is attached on an opposite side from pin actuator unit 736. In an analogous fashion to unit 736, unit 744 includes an actuator 746 that selectively moves pin 748 into aperture 734. Pins 748 and 740 may be placed halfway through aperture 734 so that both pins lock mechanism 586 and thereby provide redundancy.

In operating fixture 570, rotator cage 632 is first placed in a 0° position, i.e., with locked mechanism 586 at the top. Locking mechanism 586 is unlocked and squeeze mechanisms 598 allow first ring portion 576 and third ring portion 588 to separate, i.e., the clam shell opens for each ring of the cage. The various components that will be used to make up body 572 are then loaded into fixture 570.

The discharge gate frames (92 of FIG. 1) are loaded onto gate-frame-alignment-and-holding stations 648 using a crane. The gates are thus secured into place. The outside hopper slope sheets (94 of FIG. 1) that face towards the sides are placed in the fixture by laying them on the hopper gate frames. The bottom chord clamping mechanisms 606 are then placed with pivotal positioning arm 668 in the vertical position and clamping surfaces 656 and 654 opened. Using a crane, side assemblies 604 (18 of FIG. 1) are loaded into fixture 570. Bottom chords 652 are placed in clamping mechanisms 606 and the crane is unhooked. Center partitions (86 of FIG. 1, 510 of FIG. 7) are then loaded using a crane onto center-partition-floor-sheet-clamp-and-support mechanisms 620. The outside slope sheets of the hopper are placed flush against the floor sheets of the center partition and tack welded to the gate frames. The end assemblies (20 of FIG. 1, 636 of FIG. 34) are loaded into fixture 570. Clamping arm 622 of end assembly clamping mechanism 610 is then raised by actuating airbags 640. Thus, the end assembly is supported in position. This is repeated for the end assembly on the other end.

Squeeze mechanisms 598 are then used to gently close rotating cage 632. Locking mechanism 586 is then activated to lock cage 632. The center partition clamping mechanism 620 may then be activated to press the floor sheet thereof into position and the side slope sheets may also be pressed into position. A lock preventing rotation of cage 632 may be released. Rotating cage 632 is then rotated as necessary to various positions to allow welding of components at the desired angle to form a completed body 572.

Once the body, which does not yet have the roof, is welded together, locking mechanism 586 may be released, and first ring members 576 moved away from third ring members 580. Using a crane, the roof (16 of FIG. 1, 605 of FIG. 31) is then moved into fixture 570. The roof is positioned on the existing portion of car body 572, and ring members 576 and 580 are brought together and locking mechanism 586 is locked. In a manner analogous to that described in connection with FIG. 36, airbags may be located on an upper portion of rings 574 to press the roof down on the existing portion of car body 572. The roof may then be tack welded to the center partitions and side sheets. The rotation lock may be removed from fixture 570 and rotating cage 632 rotated to allow the desired welding position to complete all internal welding of the roof.

Once the internal welding of the roof is completed and the necessary quality inspections and the like performed, locking mechanism 586 may be unlocked and first ring portion 576 moved away from third ring portion 580, i.e., the clam shell opened again. All clamping mechanisms may then be released, and a crane attached to the end assemblies 636 may be used to lift body 572 out of fixture 570. The crane may have an attachment with two staggered surfaces for grabbing stiffeners on the end assembly (e.g., stiffeners 637 of FIG. 34). Body 572 may be placed on simple welding stands to support it while additional weldout is completed before mating the body with the underframe. Thus, at this point, a completed railcar body exists, which is preferably all aluminum alloy.

VIII. Body and Underframe Combination System and Method

A steel underframe, such as underframe 14 of FIG. 1, may be manufactured according to conventional techniques. The steel underframe and aluminum alloy body 572 are then mated at an underframe-and-body assembly station. The underframe and body assembly station may take numerous forms, but one specific embodiment is presented in connection with FIGS. 41 through 43.

Figure 41:
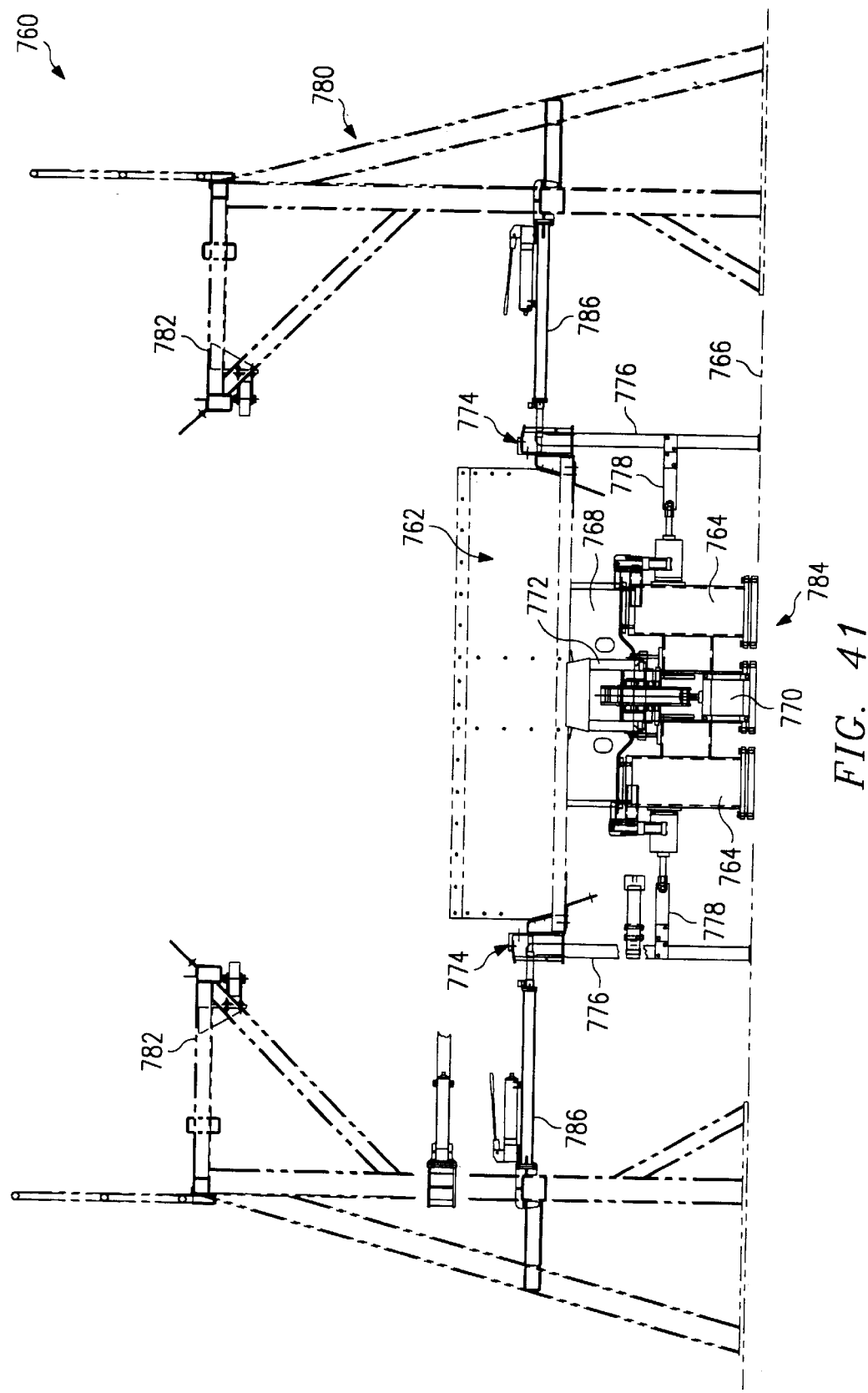
FIG. 41 is a schematic elevational end view of an underframe and body. assembly station according to an aspect of the present invention.
Figure 42:
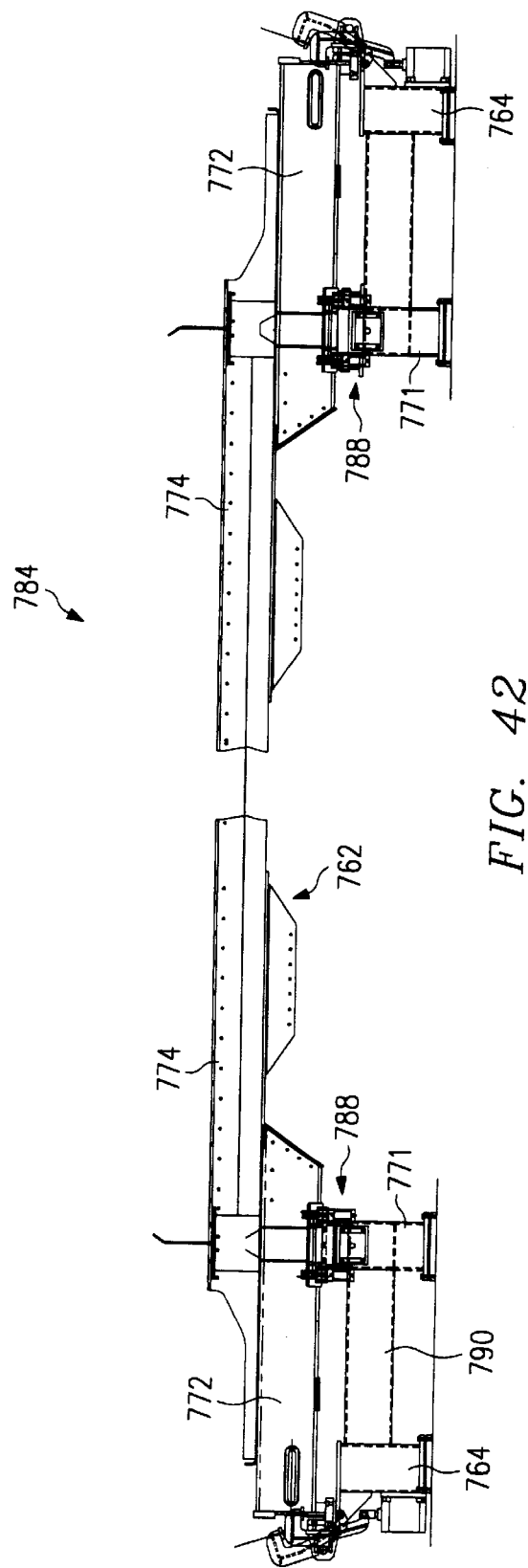
FIG. 42 is a side elevational view of an underframe support (with portions broken away) according to an aspect of the present invention.

Referring to FIGS. 41–43, an underframe-and-body assembly station 760 is shown. Underframe 762 is shown supported at station 760. Pedestal support fixtures 764 are secured to shop floor 766. Pedestal support fixtures 764 support underframe 762 by contacting a portion of body bolster 768 on each end of underframe 762. Another support pedestal 770 may support the portion of draft gear 772 of underframe 762. Side sills 774 are available to receive a bottom chord of the railcar body. Side sills 774 are supported by posts 776 in addition to the previously mentioned supports. Posts 776 may be braced by a member 778 coupled to pedestals 764. Center pedestal 770 has a center bowl with a pin for aligning and mating with the center plates of the underframe. Roof access scaffolding 780 may be provided on each side of station 760 to allow convenient access to the roof of the car body once it is mated with underframe 762. Roof access scaffolding has a walkway 782 on which the roof may be approached. Scaffolding 780 may be anchored to shop floor 766 and may further be releasably coupled to underframe support portion 784 of station 760 by coupling members 786. Members 786 may be selectively removed.

Referring to FIG. 42, a side view of underframe support 784 of station 760 is shown. A longitudinal member 790 is shown connecting pedestal 764 with another support pedestal 771. A center plate coupling unit 788 is supported by pedestal 771 for mating with the center plate on underframe 762.

Referring to FIG. 43, a portion of underframe-and-body assembly stations 760 is shown. In FIG. 43, car body 572 has been placed on and mated with underframe 762. Bottom chord 652 has been nested with side sill 774 to form a combined unit. In making the adjustments to having the proper placement and connection between bottom chords 652 and side sill 774 as well as other mating components between underframe 762 and car body 572, drilling units 786 and FIG. 41 may be used. Drilling units 802 are slidable on track 806 to a desired location laterally and longitudinally along track 808. Drilling surface 810 is shown under side sill 762. Drilling unit 804 similarly is slidable laterally on track 812 and longitudinally on tracks 814. Drilling unit 804 has a vertical drill member 816 and a lateral drill 818. Both units 802 and 804 may be located at different points throughout station 760 to drill holes for huck bolts underframe 762, and particularly, side sills 774 with respect to body 572 and particularly with respect to bottom chord 652.

In operation, steel underframe 762 is brought to underframe-and-body assembly station 760, and draft gears 770 to the various components are brought to station 760. Underframe 762 is loaded into station 760 with the center plates being located on center plate coupling units 788. Underframe 762 may be clamped at the bolsters and strikers. Then, a crane attachment may be placed on the two end assemblies of body 572 to lift car body 572 over to station 760. The crane attach members may grip cross ridge stiffeners 637 (FIG. 34). In lifting car body 572 onto underframe 762, the center partition is aligned with the center mark on the underframe. Once the mating of these two components has shown to be satisfactory so that no additional touchups or the like are needed, body 572 may again be removed from station 760 by a crane.

Isolation tape or other protective materials may then be applied between all of the areas where aluminum alloy and steel would otherwise come into contact. Other preparation steps may be completed such as welding out the hopper slope sheet angles. Once these preparatory steps are completed, aluminum alloy body 572 is again lifted by cranes onto underframe 762. The appropriate and desired holes are drilled using side sill 774 as a template. Bottom chord 652 and side sill 774 are then hucked together. The hucks are used to pull the car body to the underframe in a completed fashion. Roof access scaffolding 780 may be used to apply fasteners, such as hucks, to portions of the roof as well. The running boards (32 of FIG. 1) may then be attached to roof carlines 820 (28 of FIG. 3). Any additional welding or fasteners may then be completed. At this point, the railway car is completed. All fixtures and clamps of any type that have been used at station 760 may be removed and the car lifted using a crane to be placed on railroad tracks.

IX. Conclusion

Although the present invention and its advantages have been described in detail, it should be understood that various changes, substitutions, and alterations can be made therein without departing from the spirit and scope of the invention as defined by the appended claims.

What is claimed is:

1. A method for manufacturing a railway car, the method comprising the steps of:

manufacturing a substantially all-aluminum alloy car body by placing components of the car body including a first end assembly and a second end assembly in an open rotatable cage;

tack welding the components with each other and then rotating the car body to allow welding of each component at a respective desired welding position to form the car body as an integral unit;

manufacturing a substantially all-steel car underframe which includes a pair of steel side sills;

aligning the substantially all-aluminum alloy car body with the substantially all-steel car underframe; and mating the substantially all-aluminum alloy car body to the steel side sills of the underframe to form a railway car.

2. The method of claim 1, wherein manufacturing the substantially all-aluminum alloy car body as an integral unit further comprises:

(A) placing selected car body components in an open rotatable cage;

(B) closing and locking the rotatable cage;

(C) actuating a plurality of compression members to bring the car body components into alignment;

(D) welding portions of the car body components with welds accomplished substantially perpendicular to the gravity field;

(E) rotating the rotatable cage an incremental amount as necessary to the respective desired welding positions and welding portions of the car body components with welds accomplished substantially perpendicular to the gravity field; and (F) repeating step (E) until substantially all of the welding is completed to form the car body including the first end assembly and the second end assembly as an integral unit.

3. A method of assembling a railway car body comprising the steps of:

(A) placing selected car body components including a roof, side sheet assemblies and end assemblies in an open rotatable cage;

(B) closing and locking the rotatable cage;

(C) actuating a plurality of compression members to bring the car body components into alignment;

(D) welding portions of the car body components with welds accomplished substantially perpendicular to the gravity field;

(E) rotating the rotatable cage to respective desired welding positions and welding selected portions of the car body components with each other using welds accomplished substantially perpendicular to the gravity field; and (F) repeating step (E) until substantially all the welding is completed and the car body is formed as an integral unit.

4. A method for manufacturing a railway car, comprising:

manufacturing a substantially all-aluminum alloy car body by placing car body components including a first end assembly and a second end assembly in an open rotatable cage including an end assembly mechanism;

closing and locking the rotatable cage;

actuating a plurality of compression members to bring the car body components into alignment;

welding selected portions of the car body components with welds accomplished substantially perpendicular to the gravity field;

rotating the rotatable cage an incremental amount to respective desired welding positions and welding selected portions of the body components with each other using with welds accomplished substantially perpendicular to the gravity field;

repeating the step of rotating the rotatable cage an incremental amount until substantially all of the welding is completed and the car body is formed as an integral unit;

manufacturing a substantially all-steel car underframe which includes a pair of steel side sills;

preparing the substantially all-steel car underframe for mating with the substantially all-aluminum alloy car body by drilling holes in selected portions of the steel side sills and the all-aluminum alloy car body; and mating the car body formed as the integral unit with the underframe by inserting fasteners through the respective holes to form a railway car.

* * * * *